(12) United States Patent
Watanabe et al.

(10) Patent No.: US 9,419,804 B2
(45) Date of Patent: Aug. 16, 2016

(54) DATA AUTHENTICITY ASSURANCE METHOD, MANAGEMENT COMPUTER, AND STORAGE MEDIUM

(71) Applicant: Hitachi, Ltd., Tokyo (JP)

(72) Inventors: Natsuki Watanabe, Tokyo (JP); Yoko Hashimoto, Tokyo (JP); Kosuke Anzai, Tokyo (JP); Kunihiko Miyazaki, Tokyo (JP); Naoki Hayashi, Tokyo (JP); Yoshiaki Isobe, Tokyo (JP); Tomohisa Kumagai, Tokyo (JP); Daisuke Miyamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 94 days.

(21) Appl. No.: 14/351,673

(22) PCT Filed: Oct. 2, 2012

(86) PCT No.: PCT/JP2012/075557
§ 371 (c)(1),
(2) Date: Apr. 14, 2014

(87) PCT Pub. No.: WO2013/054701
PCT Pub. Date: Apr. 18, 2013

(65) Prior Publication Data
US 2014/0298034 A1 Oct. 2, 2014

(30) Foreign Application Priority Data
Oct. 14, 2011 (JP) .................................. 2011-227308

(51) Int. Cl.
*H04L 29/06* (2006.01)
*H04L 9/32* (2006.01)

(52) U.S. Cl.
CPC ............ *H04L 9/3247* (2013.01); *H04L 9/3236* (2013.01); *H04L 2209/38* (2013.01)

(58) Field of Classification Search
CPC . H04L 9/3236; H04L 9/3247; H04L 2209/38; H04L 2209/60; G06F 21/64
USPC .............................. 713/176, 178, 193; 726/30
See application file for complete search history.

(56) References Cited

U.S. PATENT DOCUMENTS

| 6,816,969 B2 | 11/2004 | Miyazaki et al. |
| 7,206,939 B2 | 4/2007 | Miyazaki et al. |

(Continued)

FOREIGN PATENT DOCUMENTS

| JP | 2001-251296 A | 9/2001 |
| JP | 2001-331104 A | 11/2001 |

(Continued)

OTHER PUBLICATIONS

Yuki Ashino, et al., Proposal an revaluation of a digital forensic system using Security Device and Hysteresis Signature, Computer Security Symposium 2006 Transactions, Japan, Information Processing Society of Japan, Oct. 25, 2006, vol. 2006, No. 11, p. 363-368.

*Primary Examiner* — Izunna Okeke
*Assistant Examiner* — Hee Song
(74) *Attorney, Agent, or Firm* — Volpe and Koenig, P.C.

(57) ABSTRACT

A data authenticity assurance method carried out by a management computer including: a first step of receiving the first data piece from the computer; a second step of selecting a plurality of second data pieces at predetermined intervals in chronological order from among the plurality of second data pieces held in the data holding part; a third step of performing an arithmetic operation for each of the hash values of the selected plurality of second data pieces; a fourth step of generating signature target data by combining the first data piece received from the computer with the hash values of the selected plurality of second data pieces; and a fifth step of generating a second data piece by assigning the digital signature to the signature target data by using the preset key, and holding the generated second data piece in chronological order sequentially in the data holding part.

13 Claims, 19 Drawing Sheets

(56) References Cited

U.S. PATENT DOCUMENTS

| | | | |
|---|---|---|---|
| 7,401,225 B2 | 7/2008 | Tanimoto et al. | |
| 7,574,605 B2 | 8/2009 | Tanimoto et al. | |
| 7,770,009 B2 | 8/2010 | Miyazaki et al. | |
| 2003/0009666 A1* | 1/2003 | Jakobsson | H04L 9/3236 713/168 |
| 2005/0177734 A1 | 8/2005 | Tanimoto et al. | |
| 2005/0204248 A1 | 9/2005 | Matsui | |
| 2008/0104407 A1* | 5/2008 | Horne | G06F 21/64 713/178 |
| 2009/0016534 A1* | 1/2009 | Ortiz Cornet | G06F 21/64 380/277 |
| 2009/0328218 A1* | 12/2009 | Tsurukawa | G06F 21/64 726/23 |
| 2012/0324229 A1* | 12/2012 | Buldas | H04L 9/321 713/176 |

FOREIGN PATENT DOCUMENTS

| | | |
|---|---|---|
| JP | 2001-331105 A | 11/2001 |
| JP | 2002-175009 A | 6/2002 |
| JP | 2002-335241 A | 11/2002 |
| JP | 2003-022007 A | 1/2003 |
| JP | 2003-169052 A | 6/2003 |
| JP | 2003-280972 A | 10/2003 |
| JP | 2003-283491 A | 10/2003 |
| JP | 2004-040830 A | 2/2004 |
| JP | 2004-104750 A | 4/2004 |
| JP | 2004-260640 A | 9/2004 |
| JP | 2005-223560 A | 8/2005 |
| JP | 2006-229800 A | 8/2006 |
| JP | 2008-136247 A1 | 6/2008 |
| WO | 2004/068350 A1 | 8/2004 |
| WO | 2008/026238 A1 | 3/2008 |

* cited by examiner

Fig. 5

| | LOG DATA | DATA ID | HASH VALUE OF FIRST PREVIOUS LOG RECORD | ID₁ FOR CON-CATE-NATION | HASH VALUE OF THIRD PREVIOUS LOG RECORD | ID₂ FOR CON-CATE-NATION | HASH VALUE OF SIXTH PREVIOUS LOG RECORD | ID₃ FOR CON-CATE-NATION | SIGNATURE |
|---|---|---|---|---|---|---|---|---|---|
| S1 | M1 | 1 | IV | - | IV | - | IV | - | Sign(M1‖IV‖IV‖IV) |
| S2 | M2 | 2 | H(S1) | 1 | IV | - | IV | - | Sign(M2‖H(S1)‖IV‖IV) |
| S3 | M3 | 3 | H(S2) | 2 | IV | - | IV | - | Sign(M3‖H(S2)‖IV‖IV) |
| S4 | M4 | 4 | H(S3) | 3 | H(S1) | 1 | IV | - | Sign(M4‖H(S3)‖H(S1)‖IV) |
| S5 | M5 | 5 | H(S4) | 4 | H(S2) | 2 | IV | - | Sign(M5‖H(S4)‖H(S2)‖IV) |
| S6 | M6 | 6 | H(S5) | 5 | H(S3) | 3 | IV | - | Sign(M6‖H(S5)‖H(S3)‖IV) |
| S7 | M7 | 7 | H(S6) | 6 | H(S4) | 4 | H(S1) | 1 | Sign(M7‖H(S6)‖H(S4)‖H(S1)) |
| S8 | M8 | 8 | H(S7) | 7 | H(S5) | 5 | H(S2) | 2 | Sign(M8‖H(S7)‖H(S5)‖H(S2)) |
| S9 | M9 | 9 | H(S8) | 8 | H(S6) | 6 | H(S3) | 3 | Sign(M9‖H(S8)‖H(S6)‖H(S3)) |
| S10 | M10 | 10 | H(S9) | 9 | H(S7) | 7 | H(S4) | 4 | Sign(M10‖H(S9)‖H(S7)‖H(S4)) |
| S11 | M11 | 11 | H(S10) | 10 | H(S8) | 8 | H(S5) | 5 | Sign(M11‖H(S10)‖H(S8)‖H(S5)) |

Fig. 14

| | AGGRE-GATE ID 1402 | LOG DATA 502 | DATA ID 503 | ... | HASH VALUE OF SIXTH PREVIOUS 508 | $ID_3$ FOR CON-CATE-NATION 509 | HASH VALUE OF THIRD PREVIOUS OF T 1403 | $ID_4$ FOR CON-CATE-NATION 1404 | HASH VALUE OF SIXTH PREVIOUS OF T 1405 | $ID_5$ FOR CON-CATE-NATION 1406 | SIGNATURE 1407 |
|---|---|---|---|---|---|---|---|---|---|---|---|
| S1 | s | M1 | 1 | ... | IV | - | IV | - | IV | - | Sign(M1‖IV‖IV‖IV‖H(T1)‖IV) |
| S2 | s | M2 | 2 | ... | IV | - | IV | - | IV | - | Sign(M2‖H(S1)‖IV‖IV‖H(T2)‖IV) |
| S3 | s | M3 | 3 | ... | IV | - | IV | - | IV | - | Sign(M3‖H(S2)‖IV‖IV‖H(T3)‖IV) |
| S4 | s | M4 | 4 | ... | IV | - | H(T1) | t-1 | IV | - | Sign(M4‖H(S3)‖H(S1)‖IV‖H(T4)‖IV) |
| S5 | s | M5 | 5 | ... | IV | - | H(T2) | t-2 | IV | - | Sign(M5‖H(S4)‖H(S2)‖IV‖H(T5)‖IV) |
| S6 | s | M6 | 6 | ... | IV | - | H(T3) | t-3 | IV | - | Sign(M6‖H(S5)‖H(S3)‖IV‖H(T6)‖IV) |
| S7 | s | M7 | 7 | ... | H(S1) | s-1 | H(T4) | t-4 | H(T1) | t-1 | Sign(M7‖H(S6)‖H(S4)‖H(S1)‖H(T7)‖IV) |
| S8 | s | M8 | 8 | ... | H(S2) | s-2 | H(T5) | t-5 | H(T2) | t-2 | Sign(M8‖H(S7)‖H(S5)‖H(S2)‖H(T8)‖H(T2)) |
| S9 | s | M9 | 9 | ... | H(S3) | s-3 | H(T6) | t-6 | H(T3) | t-3 | Sign(M9‖H(S8)‖H(S6)‖H(S3)‖H(T9)‖H(T3)) |
| S10 | s | M10 | 10 | ... | H(S4) | s-4 | H(T7) | t-7 | H(T4) | t-4 | Sign(M10‖H(S9)‖H(S7)‖H(S4)‖H(T10)‖H(T4)) |
| S11 | s | M11 | 11 | ... | H(S5) | s-5 | H(T8) | t-8 | H(T5) | t-5 | Sign(M11‖H(S10)‖H(S8)‖H(S5)‖H(T11)‖H(T5)) |

DATA AUTHENTICITY ASSURANCE METHOD, MANAGEMENT COMPUTER, AND STORAGE MEDIUM

INCORPORATION BY REFERENCE

The present application claims priority from Japanese patent application JP 2011-227308 filed on Oct. 14, 2011, the content of which is hereby incorporated by reference into this application.

BACKGROUND

This invention relates to a digital signature technology for long-term assurance of authenticity of log data or data that occurs in large quantity at any time.

Increasing attention is being drawn on technologies for long-term assurance of the authenticity of log data that occurs in large quantity at any time, such as: recording of linkage information on a resident ID system on which consideration is being advanced by the Japanese government; and storage of access histories relating to use/utilization of medical information and transaction data in financial systems.

There is a digital signature as a technology for assuring the authenticity of electronic data, but the digital signature expires in three to five years, which causes a problem when long-term storage thereof is set as a purpose. As a method for solving this problem, at a time of assigning a signature to every piece of data, a hash value is calculated after it is confirmed that the first previous piece of signed data has not been tampered, and the signature is assigned along with signature target data. Therefore, all the pieces of data form a hash chain by including the hash value of the first previous piece of signed data. By forming the hash chain, it is possible to link the past signature to the latest signature with the hash value, which allows the assurance of the past signature by using the latest signature. In other words, even when the signature expires, it is possible to assure the authenticity of the past data by tracing the hash chain from data (hereinafter referred to as "trust point") that is assured by an unexpired signature. In other words, the wording "tracing the hash chain" represents using the signed data forming the hash chain to repeat an operation for verifying that the first previous piece of signed data has not been tampered by comparing the hash value of the first previous piece of signed data included in the verified data with the hash value calculated from the first previous piece of signed data.

However, when the long-term assurance of the authenticity of a large quantity of log data is set as a purpose, assigning signatures to all the pieces of log data increases a load on a computer. Further, when a given piece of log data is tampered, the authenticity of the log data earlier than the given piece is no longer assured. In addition, to verify the authenticity of specific log data, it is necessary to examine all the hash chains one by one from the trust point (log data with an unexpired signature) up to the specific log data, which raises a problem of increasing the load on the computer.

In order to solve those problems, in WO 2008/026238, there is disclosed a method of reducing a frequency at which a signature is assigned to the data forming the hash chain down to once every a plurality of pieces, to thereby reduce the load on the computer. At this time, a method of saving the hash value of the first previous piece of data to a tamper-resistant apparatus is disclosed as a method of assuring that the first previous piece of data has not been tampered. In other words, it is possible to confirm that the first previous piece of data has not been tampered when the verification is performed by comparing the hash value saved to the tamper-resistant apparatus with the hash value calculated from the first previous piece of data.

Further, as the assurance of the authenticity of the log data earlier than a given piece of log data performed when the given piece is tampered, there is disclosed a method of forming hash values of a plurality of pieces of log data to have a tree-like hierarchical structure by combining the hash values to take a hash value of the combined hash values, and limiting an influence range of tampering to a specific range when a lower part of the tree is tampered.

SUMMARY

WO 2008/026238 discloses that a hash tree structure is created to thereby limit an influence range of tampering to a specific range. However, such a structure that the authenticity of a given node is assured by a node at a higher level than the given node is employed, and hence there is vulnerability to a loss of the authenticity of an entire hash tree caused when the hash value corresponding to the node at the top level is tampered. Therefore, the object of maintaining the authenticity of the hash chain even when a given piece of data is tampered is solved only in a limited manner.

Further, WO 2008/026238 discloses that the hash value is generated after the hash values of the plurality of pieces of log data are combined when the hash tree structure is generated, but does not disclose a method of assuring that a plurality of hash values thereof are not tampered. For example, it is conceivable to employ a method of saving the plurality of pieces of log data to the tamper-resistant apparatus as well as saving the first previous piece of log data to the tamper-resistant apparatus, but when consideration is given to handling of a large quantity of log data, there is a fear that a capacity of the tamper-resistant apparatus may be exceeded by saving all the plurality of pieces of log data to the tamper-resistant apparatus. The problem of the capacity can be solved by executing the same function as the tamper-resistant apparatus in a software manner, but in that case, the load on the computer becomes excessive when the hash tree is generated. When a complicated hash chain is thus generated for a large quantity of log data, it is necessary to reduce the load on the computer.

Further, WO 2008/026238 has a problem in that, to confirm the authenticity of specific past data, all the hash chains need to be traced back from the present to the specific past data, which requires much time for calculation.

Therefore, this invention has been made in view of the above-mentioned circumstances, and an object thereof is to quickly perform, in a digital signature technology for long-term assurance of authenticity of log data or data that occurs in large quantity at any time: maintenance of authenticity of other pieces of data at a time when a given piece of data is tampered; and verification of specific log data. Another object thereof is to reduce a load on a computer when a digital signature is generated.

A representative aspect of this invention is as follows. A data authenticity assurance method carried out by a management computer comprising a processor and a memory, comprising: carrying out signature generation processing for generating a second data piece by assigning a digital signature to data, which is obtained by combining a first data piece received from a computer with a hash value of at least one second data piece acquired from second data pieces held in a data holding part of the management computer, by using a preset key, and holding the generated second data piece in the data holding part; and carrying out signature verification processing for verifying authenticity by intermittently tracing a plurality of hash chains based on a plurality of second data pieces held in the data holding part and the second data piece of a verification target, wherein: the carrying out of the signature generation processing comprises: a first step of receiving the first data piece from the computer; a second step of selecting a plurality of second data pieces at predetermined intervals in chronological order from among the plurality of second data pieces held in the data holding part; a third step of performing an arithmetic operation for each of the hash values of the selected plurality of second data pieces; a fourth step of generating signature target data by combining the first data piece received from the computer with the hash values of the selected plurality of second data pieces; and a fifth step of generating a second data piece by assigning the digital signature to the signature target data by using the preset key, and holding the generated second data piece in chronological order sequentially in the data holding part; and the carrying out of the signature verification processing comprises: a sixth step of receiving the second data piece of the verification target; a seventh step of acquiring a second data piece that is verifiable alone from the data holding part, and verifying the second data piece; and an eighth step of performing verification for the second data piece of the verification target to the second data piece that is verifiable alone by sequentially comparing a hash value obtained by the arithmetic operation from the second data piece with the second data piece including the hash value, and performing the verification by intermittently tracing the plurality of hash chains.

Further, the data authenticity assurance method, wherein the second step comprises selecting, by the management computer, from the first previous second data piece and the (n×2^(p−1))th previous second data piece, the (N×2^(p−1)) being a general term serving as a geometric progression of a first term of N and a common ratio of 2, when the at least one second data piece is selected at the predetermined intervals in chronological order.

Accordingly, according to one embodiment of this invention, in the digital signature technology for the long-term assurance of the authenticity of data that occurs in large quantity at any time, all second data pieces (for example, log records) have a plurality of hash values of the second data pieces each positioned a plurality of second data pieces before, to thereby form a plurality of hash chains. Therefore, even when a given second data piece is tampered, the authenticity of another second data piece can be assured by another hash chain. At this time, the number of verification steps for the digital signature can be reduced by efficiently performing the verification of the second data piece positioned a plurality of second data pieces before, and the second data piece can be generated while reducing a load on the computer imposed when the digital signature is generated.

Further, the hash chain for the second data piece positioned a plurality of second data pieces before is created when the second data piece is generated, to thereby reduce the number of steps of the verification process for the hash chain, and hence it is possible to verify the second data piece of a verification target at high speed. In addition, the processing for verifying whether or not the second data piece positioned a plurality of second data pieces before has been tampered is performed when the second data piece is generated, and hence the tampering of the second data piece can be discovered at an early stage.

BRIEF DESCRIPTION OF THE DRAWINGS

FIG. 5 shows the first embodiment of this invention, and is a diagram illustrating an example of a history of the signatures of the log records.

FIG. 14 shows a fourth embodiment of this invention, and is a diagram illustrating a structure of the hash chain for visualizing the structure of the hash chain of the log record.

DETAILED DESCRIPTION OF THE PREFERRED EMBODIMENTS

Now, embodiments of this invention are described with reference to FIG. 1 to FIG. 9.

First, a configuration of a first embodiment of this invention is described with reference to FIG. 1.

Figure 1:
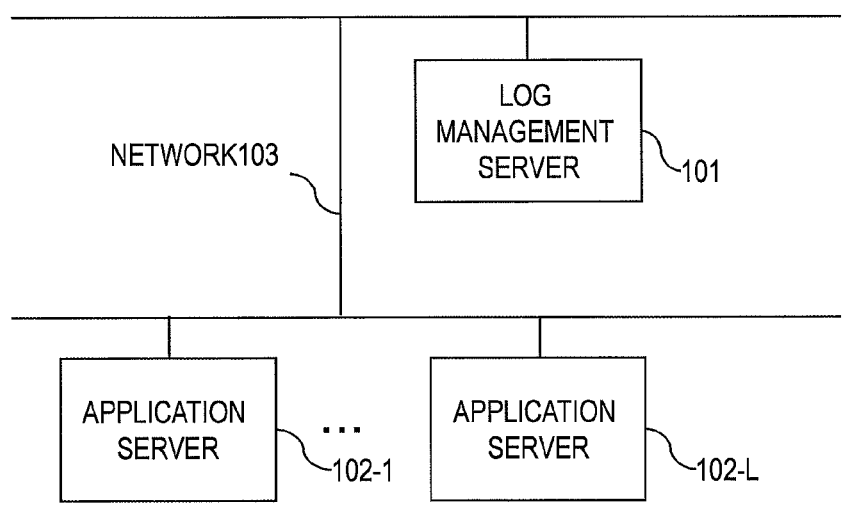
FIG. 1 shows a first embodiment of this invention, and is a block diagram illustrating an example of a data processing system.

FIG. 1 is a block diagram illustrating an example of a data processing system to which the first embodiment of this invention is applied.

The data processing system according to the first embodiment includes an application server 102-1 to an application server 102-L (hereinafter referred to collectively as "application server 102") for providing a computer of a user with a task application, a database, and the like, a log management server 101 for collecting logs from the application servers 102 and managing the logs, and a network 103 for coupling the respective servers to one another.

Next, respective apparatus included in the data processing system illustrated in FIG. 1 are described.

Figure 2:
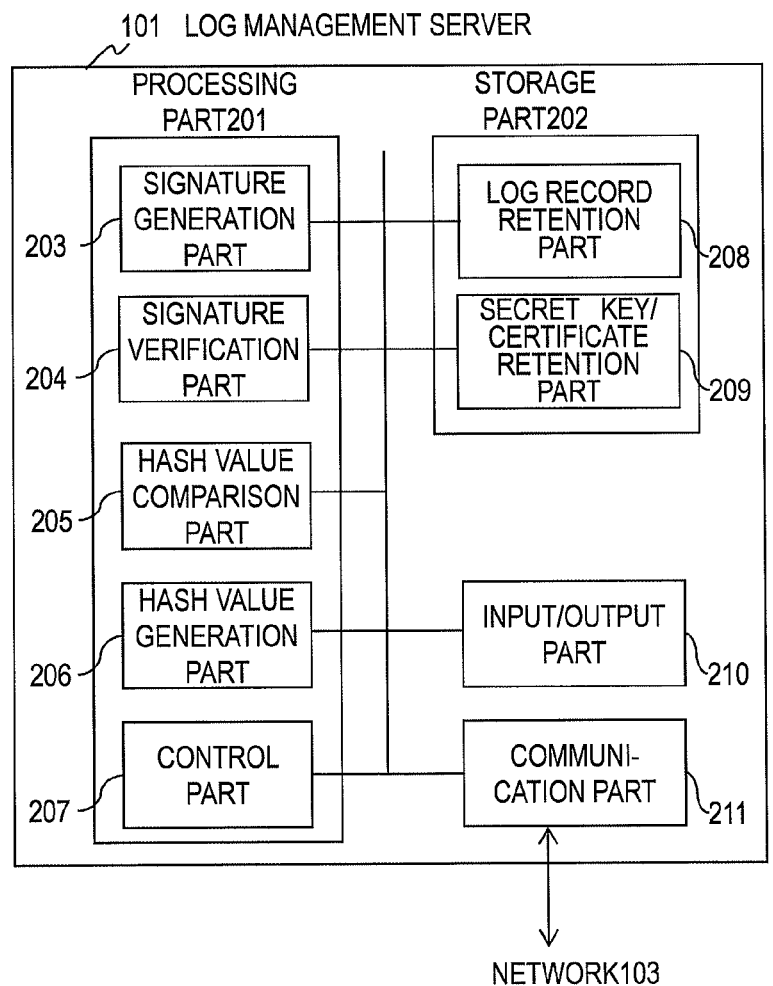
FIG. 2 shows the first embodiment of this invention, and is a block diagram illustrating an example of functional components of the log management server.

First, the log management server 101 is described with reference to FIG. 2. FIG. 2 is a block diagram illustrating an example of functional components of the log management server 101.

The log management server 101 includes a processing part 201 for generating a log record from log data sent from the application server 102 and performing verification of the log record and determination of authenticity thereof in response to a request received from the user, a storage part 202 for storing the log record generated by the log management server 101 and data such as a key necessary for processing, an input/output part 210 for receiving an input from the user or an administrator, and a communication part 211 for receiving the log data output from the application server 102. It should be noted that, in the following description, the log output by the application server 102 is referred to as "log data", and the log processed by the log management server 101 in such a manner as described later is referred to as "log record".

The processing part 201 includes a signature generation part 203 for assigning a signature to data obtained by combining the log data with the hash value of the log record, a signature verification part 204 for verifying the signature of the log record, a hash value comparison part 205 for performing the verification by comparing a given hash value included in the log record with the log record relating to the given hash value, a hash value generation part 206 for generating a hash value by taking the hash value of the log record, and a control part 207 for controlling those parts.

The storage part 202 includes a log record holding part 208 for storing a log that has been subjected to signature processing and the like and a secret key/certificate holding part 209 for holding a secret key, a certificate, and a public key used for performing signature generation and verification. It is also conceivable that the secret key and the certificate are saved to, for example, a tamper-resistant apparatus.

It should be noted that, although not shown, the signature verification part 204 may include the hash value comparison part 205, and the signature generation part 203 may include the hash value generation part 206.

Figure 3:
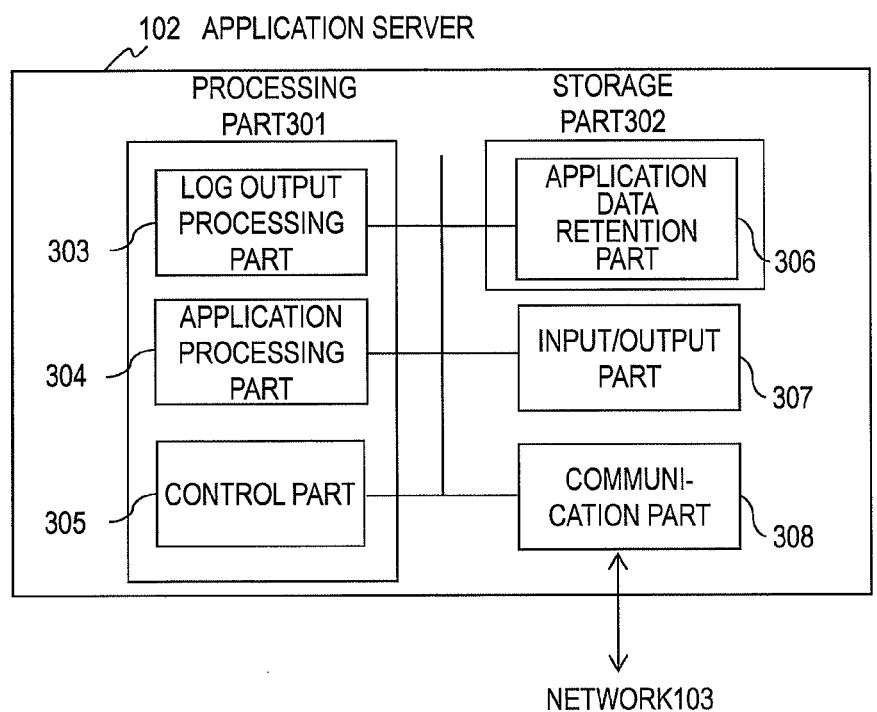
FIG. 3 shows the first embodiment of this invention, and is a block diagram illustrating an example of functional components of the application server.

Next, the application server 102 is described with reference to FIG. 3. FIG. 3 is a block diagram illustrating an example of functional components of the application server 102.

The application server 102 includes a processing part 301 for executing an application and outputting a log, a storage part 302, an input/output part 307 for receiving an input from the user, and a communication part 308 for communicating to/from the log management server 101 and another application server.

The processing part 301 includes a log output processing part 303 for performing processing for sending the log generated by the application server 102 to the log management server 101, an application processing part 304 for performing execution of the application and the like, and a control part 305 for controlling those parts.

The storage part 302 includes an application data holding part 306 for storing data necessary to execute the application.

Figure 4:
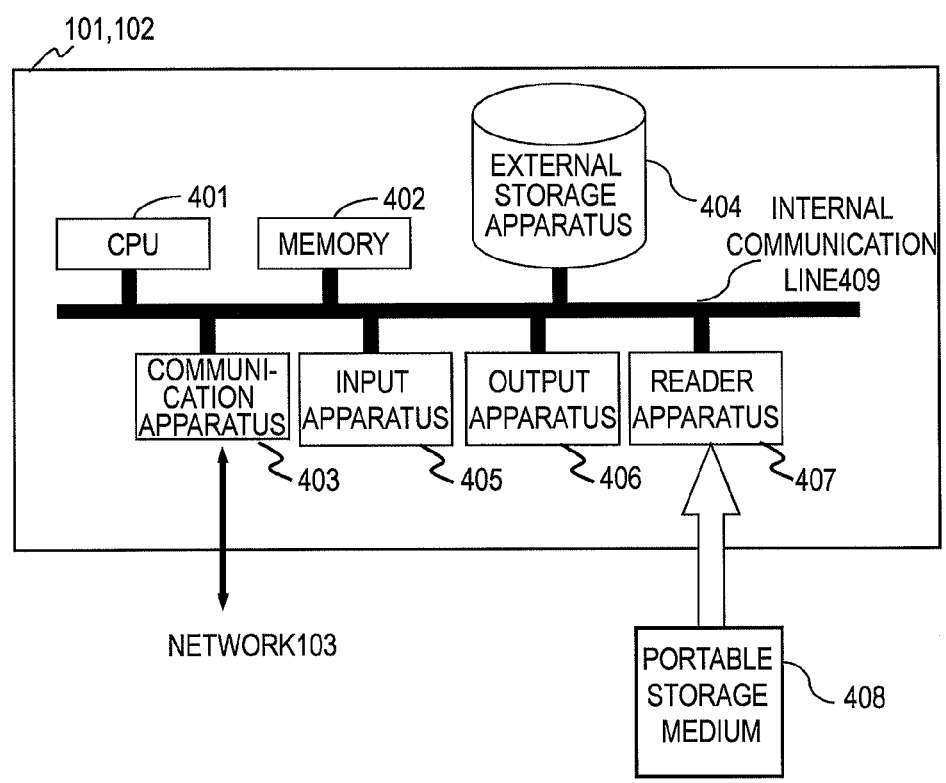
FIG. 4 shows the first embodiment of this invention, and is a block diagram illustrating an example of a log management server and application server.

It should be noted that the processing parts 201 and 301 of the log management server 101 and the application server 102, respectively, exemplified in FIG. 2 and FIG. 3 can be embodied by, for example, a CPU 401 executing a predetermined program loaded into a memory 402 on a general electronic computer including, as illustrated in FIG. 4, the CPU 401, the memory 402, an external storage apparatus 404 such as a hard disk drive, a communication apparatus 403 for performing communications to/from another apparatus through the Internet or the network 103, an input apparatus 405 such as a keyboard and a mouse, an output apparatus 406 such as a display apparatus and a printer, a reader apparatus 407 for reading information from a portable storage medium 408, and an internal communication line 409 for coupling those respective apparatus to one another.

The above-mentioned respective apparatus can be realized by using a general computer including the CPU 401 and a storage apparatus or using programs or hardware having functions equivalent to those of the general computer.

Further, each of the above-mentioned processing parts can be realized by the CPU 401 executing predetermined programs loaded into the memory 402 from the external storage apparatus 404. In other words, the communication parts 211 and 308 are realized by the CPU 401 using the communication apparatus 403. The input/output parts 210 and 307 are realized by the CPU 401 using the input apparatus 405, the output apparatus 406, and the reader apparatus 407. Further, the storage parts 202 and 302 are realized by the CPU 401 using the memory 402 and the external storage apparatus 404. Further, the processing parts 201 and 301 are realized as processes of the CPU 401.

Those programs may be stored in the memory 402 or the external storage apparatus 404 within the above-mentioned electronic computer in advance, or may be introduced from the detachably attachable storage medium 408 that can be used by the above-mentioned electronic computer or from another apparatus through a communication medium (such as the network 103; or a carrier wave or a digital signal that propagates thereon) as the need arises.

Further, this embodiment is described as being realized by such configurations as illustrated in FIG. 1 to FIG. 3, but this invention is not limited to those configurations. Not only the log management server 101 but also the application server 102 may have a function of managing the log record.

Next, with reference to FIG. 5, a detailed description is made of the log record held in the log record holding part 208 of the log management server 101. The description of this embodiment is directed to a case of including the third previous log record and the sixth previous log record as examples of the log record positioned a plurality of log records before. It should be noted that those log records are generated by the signature generation part 203 of the log management server 101.

One log record 501 includes log data 502 serving as a body of the log data transmitted from the application server 102, a data ID 503 serving as a unique ID indicating the log data 502, a hash value 504 of the first previous log record, an $ID_1$ 505 for concatenation serving as a unique ID indicating the hash value 504 of the first previous log record, a hash value 506 of the third previous log record, an $ID_2$ 507 for concatenation serving as a unique ID indicating the hash value of the third previous log record, a hash value 508 of the sixth previous log record, an $ID_3$ 509 for concatenation serving as a unique ID indicating the hash value of the sixth previous log record (the $ID_1$ for concatenation to the $ID_3$ for concatenation are hereinafter referred to collectively as "ID for concatenation"), and a signature 510 obtained by assigning a digital signature to the respective fields 502 to 509.

The a-th log record is hereinafter referred to as "log record Sa". Further, a specific description is made below by taking an example of a log record S8. The log record S8 includes "M8" as the log data 502, "8" as the data ID 503 of the log data M8, "H(S7)" ("H(S7)" indicates the hash value calculated from the log record S7. The same applies in the following description) as the hash value 504 of the first previous log record, "7" as the $ID_1$ for concatenation, "H(S5)" as the hash value 506 of the third previous log record, "5" as the $ID_2$ for concatenation, "H(S2)" as the hash value 508 of the sixth previous log record, "2" as the $ID_3$ for concatenation, and the signature 510 obtained as a result of assigning the signature to the log data M8, H(S7), H(S5), and H(S2).

The signature generation part 203 of the log management server 101 assigns the digital signature to the record of the log data received from the application server 102 after subjecting each of the hash value 504 of the first previous (immediately previous) log record and the hash value 506 of the third previous log record to an arithmetic operation and replicating the hash value 508 of the sixth previous log record from the third previous log record. Further, the signature generation part 203 assigns the IDs for concatenation to the first previous, the third previous, and the sixth previous log records.

It should be noted that the log records illustrated in FIG. 5 illustrate a history of the signatures 510 of the log records generated by the log management server 101 from the log data on specific data subjected to the processing by the application server 102. The log record holding part 208 stores such a history of the signature 510 of the log record as illustrated in FIG. 5 for each piece of data processed by the application server 102.

Figure 6:
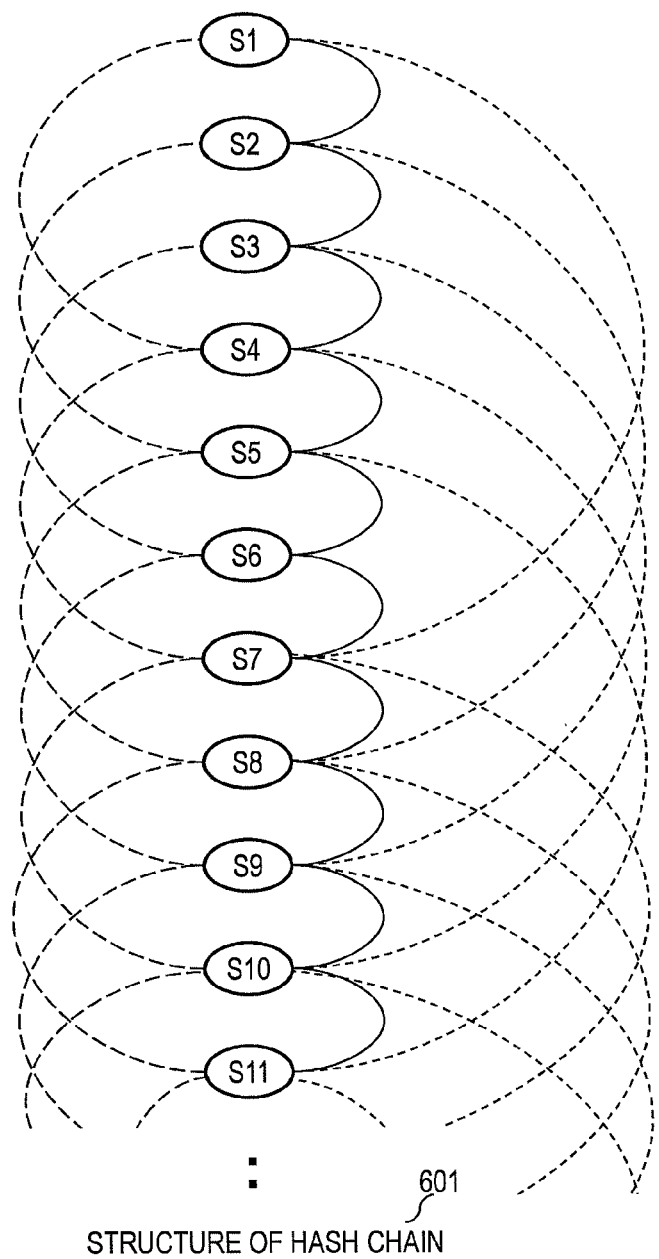
FIG. 6 shows the first embodiment of this invention, and is a diagram illustrating an example of a hash chain.

Next, FIG. 6 illustrates a structure 601 of a hash chain for visualizing a structure of a hash chain of the log record exemplified in FIG. 5. As illustrated in FIG. 5, one log record includes the hash values of the first previous, the third previous, and the sixth previous log records, and as illustrated in FIG. 6, all the log records each form chains (hash chains) of the log records by the hash values of the first previous, the third previous, and the sixth previous log records. In other words, a plurality of hash chains are generated from one log record.

Figure 7:
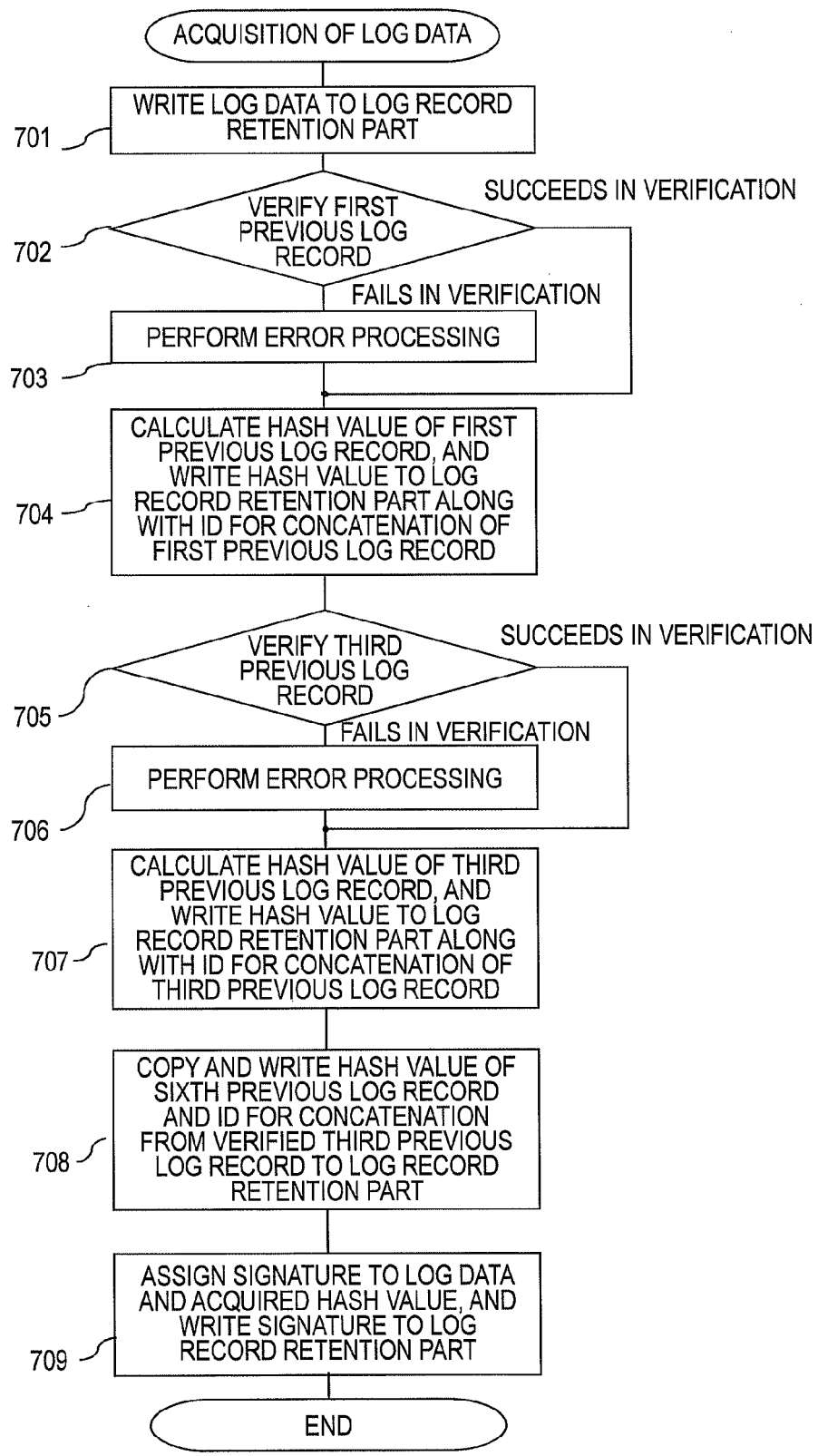
FIG. 7 shows the first embodiment of this invention, and is a flowchart illustrating an example of the processing performed by a log management server.

Next, a description is made of an example of processing performed by the data processing system according to this embodiment. First, with reference to FIG. 7, a description is made of an example of a generation method for the log record. FIG. 7 is a flowchart illustrating an example of the processing performed by the control part 207 of the log management server 101 when generating one of the log records illustrated in FIG. 5. Here, the description is made by taking an example of processing for generating a log record S11 illustrated in FIG. 5. It should be noted that the processing of FIG. 7 is executed at a predetermined timing such as when the log management server 101 receives the log data.

The control part 207 starts the processing by receiving log data M11 from the application server 102. First, the log data M11 acquired from the communication part 211 is saved to the log record holding part 208 as a new log record (Step 701). It should be noted that the new log record may be generated by the signature generation part 203.

Subsequently, the signature verification part 204 verifies a log record S10 serving as the first previous log record saved to the log record holding part 208 (Step 702). Specifically, the signature verification part 204 acquires the public key from the certificate saved to the secret key/certificate holding part 209 in advance, acquires data decrypted by applying the public key to the signature 510 of the log record S10, and compares the acquired data with the hash value of the log record S10. The signature verification part 204 acquires log data M10 and hash values H(S9), H(S7), and H(S4) from the signature 510 subjected to the digital signature with the public key, and compares the log data 502 of the log record S10 with the hash values 504, 506, and 508, to thereby verify the authenticity of the log record S10. In other words, when the log data and the hash values included in the signature 510 subjected to the digital signature are equal to the log data 502 and the respective hash values 504, 506, and 508 of the log record S10, respectively, it is assured that the log record S10 is valid data that has not been tampered. It should be noted that the signature verification part 204 may perform the verification for the hash values included in the signature 510 subjected to the digital signature and the respective hash values 504, 506, and 508 of the log record S10.

When it is confirmed as a result of the verification that the log record S10 has not been tampered ("SUCCEEDS IN VERIFICATION" in Step 702), the signature verification part 204 generates the hash value of the log record S10 by the hash value generation part 206 of the signature generation part 203, and saves the hash value to the log record holding part 208 along with the data ID 503 of "10" (Step 704). Therefore, after the signature verification part 204 verifies that the log record S10 has not been tampered, the signature generation part 203 can add the hash value of the first previous log record S10 to the hash chain of the log record S11. On the other hand, when the first previous log record S10 has been tampered or erased, the procedure advances to Step 703, and the signature verification part 204 carries out error processing as described later.

Subsequently, the signature verification part 204 verifies the log record S8 serving as the third previous log record saved to the log record holding part 208 in the same manner as in the above-mentioned Step 702, and when a verification result is correct ("SUCCEEDS IN VERIFICATION" in Step 705), the hash value generation part 206 generates the hash value of the log record S8, and saves the hash value to the log record holding part 208 along with the $ID_2$ 507 for concatenation of "8" (Step 707). Therefore, after the signature verification part 204 verifies that the log record S8 has not been tampered, the hash value generation part 206 can add the hash value of the third previous log record S8 to the hash chain of the log record S11. On the other hand, when the third previous log record S8 has been tampered or erased, the procedure advances to Step 706, and the signature verification part 204 carries out the error processing as described later.

Further, a hash value H(S5) of the sixth previous log record is also saved in the third previous log record S8, and hence the hash value generation part 206 replicates the hash value H(S5), and saves the hash value to the log record holding part 208 along with the $ID_3$ 509 for concatenation of "5" (Step 708). At this time, it was already verified in Step 705 that the third previous log record S8 has not been tampered, and hence it is also already verified that H(S5) included in the log record S8 as a part thereof has not been tampered.

Subsequently, the signature generation part 203 assigns the digital signature to the log data (message) M11 acquired from the application server 102, hash values H(S10), H(S8), and H(S5), and the data ID 503 of "11" and IDs for concatenation of "10", "8", and "5" that are IDs of those hash values. In other words, the signature generation part 203 uses the secret key saved in the secret key/certificate holding part 209 to calculate a signature value for the log data. Subsequently, the signature generation part 203 saves the obtained signature 510 to the log record holding part 208 (Step 709).

By the processing of the above-mentioned Steps 701 to 709, the log management server 101 generates the log record S11 from the received log data M11 by assigning the digital signature to the hash values of the log records S10, S8, and S5 with the secret key, and stores the log record S11 in the log record holding part 208.

In the above-mentioned processing, an example in which (N×2^(p−1))th previous log record is acquired as a method of selecting the log record positioned a plurality of log records before is described.

In the expression, N represents a constant of a natural number, p represents a variable of a natural number assuming values of 1 to n, and n represents a value indicating how many hash values of log records each positioned a plurality of log records before are to be acquired. It should be noted that, in the example of FIG. 5 described above, the example in which the immediately previous log record and n (N×2^(p−1))th previous log records are acquired.

The verification that each log record has not been tampered and the calculation of the hash value can be performed based on the one-time comparison of the hash values and the replication of the hash value, and hence a load of the arithmetic operation on the log management server 101 imposed when the log record is generated is alleviated.

The specific description is made on the assumption that N=3, p={1, 2, 3, 4}, and n=4. The log records each positioned a plurality of log records before are selected at this time as the third previous log record when p=1, the sixth previous log record when p=2, the twelfth previous log record when p=3, and the twenty-fourth previous log record when p=4, and all the log records have the hash values of the third previous, the sixth previous, the twelfth previous, and the twenty-fourth previous log records. To generate a new log record, after verifying the third previous log record by the signature verification part 204, the signature generation part 203 acquires and replicates the hash value of the sixth previous log record (which means another third previous log record for the third previous log record) included in the third previous log record, and compares the acquired hash, value with the hash value calculated from the sixth previous log record, to thereby verify the sixth previous log record. The sixth previous log record verified by the signature verification part 204 includes the hash value of the twelfth previous log record (which means another sixth previous log record for the sixth previous log record), and hence the signature generation part 203 acquires and replicates the hash value of the twelfth previous log record, and compares the acquired hash value with the hash value calculated from the twelfth previous log record, to thereby verify the twelfth previous log record. The twelfth previous log record verified by the signature verification part 204 includes the twenty-fourth previous log record (which means another twelfth previous log record for the twelfth previous log record), and hence the signature generation part 203 replicates the hash value thereof, and brings the processing to an end.

In this manner, the signature generation part 203 can generate the log record including the hash values of the third previous, the sixth previous, the twelfth previous, and the twenty-fourth previous log records by performing signature verification processing once, the hash value comparison processing twice, and replication processing four times.

On the other hand, in the error processing executed in Step 703 and Step 706 by the signature verification part 204, an alert indicating that the verification processing for the log record has failed and a verification target log record may have been tampered or erased is issued to the user. For example, the data ID 503 of the tampered log record is output to the computer used by the user along with an error message, to be displayed on the output apparatus 406 of the computer.

As described above, in the first embodiment of this invention, to generate a new log record of specific log data, a plurality of log records relating to the specific log data are sorted in chronological order of the signature 510, and the immediately previous log record is selected along with n log records at predetermined intervals of N log records in descending chronological order of the signature 510. Then, the log management server 101 performs an arithmetic operation for each of the hash values of the immediately previous log record and the N-th previous log record. Then, as the hash value of the log record earlier than the N-th previous log record (log record positioned N×(2 or more) log records before), the hash value stored in the N-th previous log record is replicated. The log management server 101 stores n+1 hash values in the new log record, but actually performs the arithmetic operation only twice for the hash values of the immediately previous log record and the N-th previous log record while only replicating the other hash values, which can reduce the load of the arithmetic operation.

In other words, to generate a new log record, the log management server 101 selects a plurality of log records at predetermined intervals in chronological order of the digital signature 510, performs the arithmetic operation for the hash value of the latest log record among the selected plurality of log records, and performs the arithmetic operation for the hash value of the immediately previous log record. Then, the log management server 101 replicates the hash values held in the respective log records as the hash values of the selected plurality of log records other than the latest log record.

Figure 8:
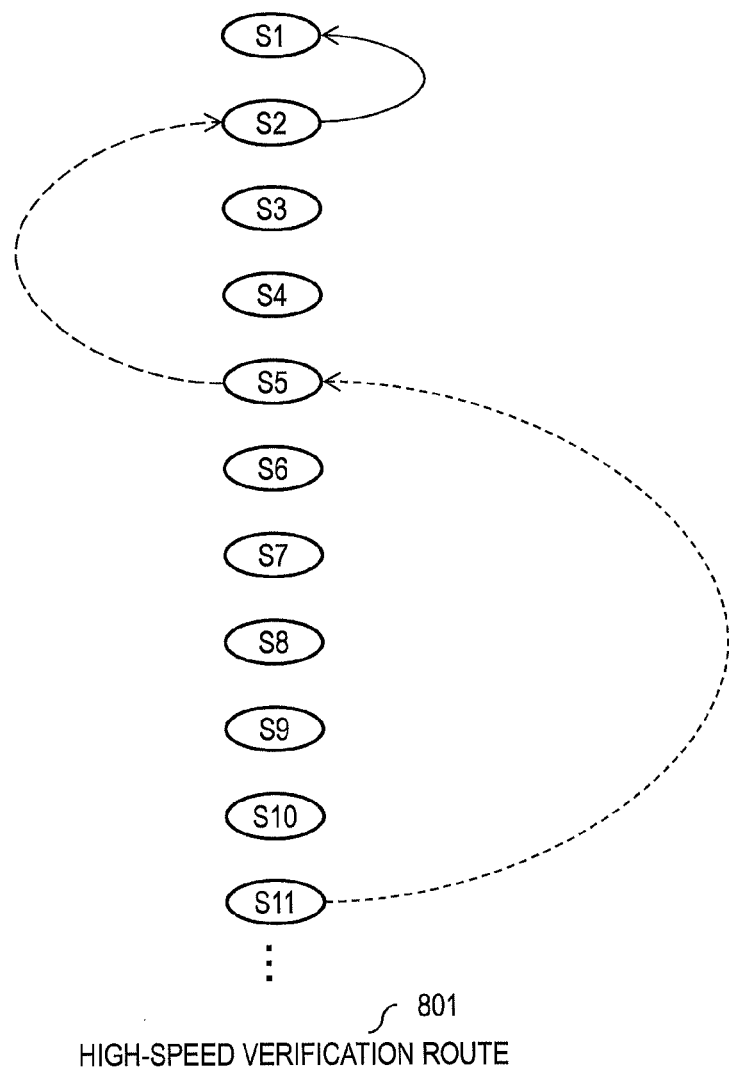
FIG. 8 shows the first embodiment of this invention, and is a diagram illustrating an example of tracing the log when high-speed verification is performed.
Figure 9:
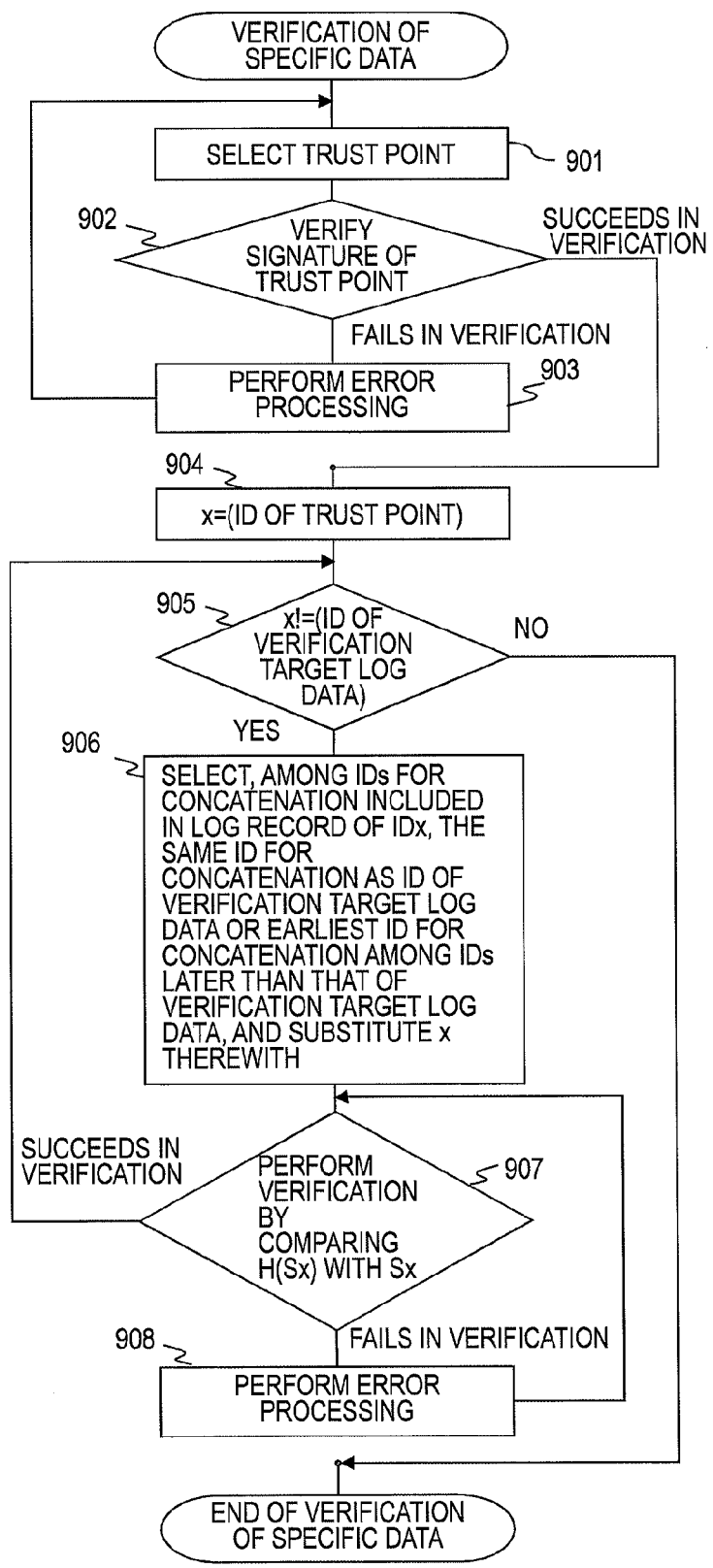
FIG. 9 shows the first embodiment of this invention, and is a flowchart illustrating an example of the verification processing for the high-speed verification.

Next, with reference to FIG. 8 and FIG. 9, a description is made of an example of a high-speed verification method for a specific log record. Here, the specific data represents the log record for which a verification request has been received by the input/output part 210 from the computer of the user or the log record for which a verification request has been received from the input apparatus 405.

FIG. 8 is a diagram illustrating an example of tracing the log when high-speed verification is performed. FIG. 8 illustrates a high-speed verification route 801 exemplifying the shortest route for verifying the log record S1 when the log record S11 is set as a trust point. At this time, it is assumed that the signatures of the log records S1 to S10 have already expired. Here, as an example, an example in which the verification is performed in three steps is described. In this example, by performing the comparison and verification of the signature 510 and the hash value for the hash value of the sixth previous log record S5 which is the earliest one of the hash values included in the log record, it is possible to omit the number of steps compared to the case of tracing the hash chains one by one. At this time, a range of omission is gradually narrowed down by performing the comparison of the hash value for the second earliest hash value when the earliest hash value is earlier than the specific data and performing the comparison for the third earliest hash value when the second earliest hash value is earlier than the specific data, thereby realizing the verification of the authenticity of the specific data with the least number of steps.

In the example of FIG. 8, for the hash value of the sixth previous log record S5 which is the earliest one of the hash values included in the log record S11, the signature verification part 204 calculates and verifies the hash value H(S5) included in the log record S11 and the hash value of the log record S5.

Subsequently, the signature verification part 204 calculates the earliest hash value H(S2) included in the log record S5 and the hash value of the log record S2, and performs the verification thereof in the same manner as described above.

Finally, the signature verification part 204 calculates the earliest (immediately previous) hash value H(S1) included in the log record S2 and the hash value of the log record S1, and performs the verification thereof in the same manner as described above.

By performing the verification three times as described above, the signature verification part 204 can assure that the log record S11 is authenticated data on the log record S1. Therefore, without the need to trace back all the log records S1 to S10, the log management server 101 can quickly perform the verification by tracing back the log records S5 and S2 for the authenticity of the log record S11 for which a request has been made.

FIG. 9 is a flowchart illustrating an example of the verification processing for the high-speed verification route 801 of FIG. 8 performed by the signature verification part 204. The detailed description is made below with reference to FIG. 9.

First, the log record to be verified is acquired from the input/output part 210, and the trust point is selected. The trust point to be selected is a log record that has an unexpired signature and is closest to the verification target log record. In this case, it is assumed that the signatures of the log records S1 to S10 illustrated in FIG. 8 have expired, and hence the log record S11 is selected as the trust point (Step 901).

Subsequently, the signature of the trust point is verified by the signature verification part 204 (Step 902). When the trust point is verified, a variable x that holds the data ID of the verified log record is initialized to the data ID of the trust point (Step 904). According to the example of FIG. 8, the variable x is substituted with "11". From that point on, Step 906 to Step 908 are repeated until the variable x reaches the ID of the verification target (ID of 1 according to the example of FIG. 8) (Step 905).

On the other hand, when the verification of the log record fails in Step 902, the signature verification part 204 advances to Step 903 to execute the error processing described later.

The signature verification part 204 selects, among IDs for concatenation included in a log record Sx, and are the same ID for concatenation as the data ID of the verification target log record or the earliest ID for concatenation among IDs later than that of the verification target log record, and substitutes the variable x therewith (Step 906). Specifically, the ID for concatenation of the hash value H(S5) satisfying the above-mentioned condition among the hash values included in the log record S11 illustrated in FIG. 5 is "5", and hence the variable x is substituted with "5".

Subsequently, the hash value comparison part 205 compares the hash value H(S5) with the calculated hash value of the log record S5, to thereby perform partial verification of the structure 601 of the hash chain illustrated in FIG. 5 (Step 907). Therefore, the signature verification part 204 assures that the log record S5 has not been tampered.

The log record S5 is not the verification target log record, and hence Steps 906 to 908 are repeated. In other words, the hash value H(S2) satisfying the above-mentioned condition among the hash values included in the log record S5 is compared with the calculated hash value of the log record S2, and further partial verification of the structure 601 of the hash chain illustrated in FIG. 6 is performed. The log record S2 is not the verification target log record, and hence the hash value H(S1) satisfying the above-mentioned condition among the hash values included in the log record S2 is compared with the calculated hash value of the log record S1, and the partial verification of the hash chain is performed, which brings the verification of the verification target log record to an end.

In the error processing of Step 903, the signature verification part 204 issues, to the user, an alert indicating that the data of the trust point may have been tampered or erased. For example, the data ID 503 of the tampered log record is transmitted to the computer of the user along with the error message, to be displayed on the output apparatus 406 of the computer.

In this error processing of Step 903, the procedure returns to Step 901 to select a new trust point. At this time, it is assumed that the new trust point to be selected is a log record that has an unexpired signature and is closest to the verification target log record, but is not a log record that has caused an error. After that, the above-mentioned processing of Step 902 and the subsequent steps is executed.

Further, when the verification of the log record fails in Step 907, the signature verification part 204 advances to Step 908 to execute the error processing described later.

In the error processing of Step 908, an alert that the verification processing has failed and the log record may have been tampered or erased is issued to the user. For example, the data ID 503 of the tampered log record is transmitted to the computer of the user along with the error message, to be displayed on the output apparatus 406 of the computer.

Subsequently, in this error processing of Step 903, the verification of the specific data may be continued in another verification route. For example, it is also possible to select a verification route other than the high-speed verification route 801 illustrated in FIG. 8. For example, as a method of selecting another verification route, it is conceivable to select a verification route caused from another hash value included in the verified log record or a verification route caused from another hash value included in the log record that has assured the verified log record.

As an example, a description is made of a case where the verification of the data of the log record S5 has failed in the verification processing for the above-mentioned specific data. The signature verification part 204 first selects the log record S11 as the trust point (Step 901). The signature verification part 204 verifies the log record S11 of the selected trust point (Step 902), and substitutes the variable x with "11" (Step 904). "11" is not the data ID of the verification target log data (Step 905), and hence the variable x is substituted with the ID of "5" satisfying the condition of being, among the IDs for concatenation for the hash values included in the log record S11, the same ID for concatenation as the data ID of the verification target log record or the earliest ID for concatenation among the IDs later than that of the verification target log record (Step 906). Subsequently, the hash value H(S5) and the log record S5 are verified by the hash value comparison part 205 (Step 205). Here, the verification of the log record S5 fails as described above, and hence the error processing (Step 908) is performed to select the alert to be issued to the user and another verification route. In this example, of other hash values H(S8) and H(S10) that are included in the log record S11, the hash value H(S8) closer to the verification target log record S1 is selected as a new verification route. Subsequently, the hash value H(S8) and the log record S8 are verified by the hash value comparison part 205 (Step 908). The log record S8 can be verified, and hence the above-mentioned normal verification processing for the specific data is performed to repeat Step 906 to Step 908. Specifically, the hash value H(S2) is selected from among the hash values included in the log record S8 (Step 906), and the hash value H(S2) and the hash value calculated from the log record S2 are verified by the hash value comparison part 205 (Step 908). The hash value H(S1) included in the verified log record S2 and the hash value calculated from the log record S1 are verified by the hash value comparison part 205, and the verification of the log record S1 is brought to an end. In this manner, even when a given piece of data has been tampered or erased, by using the hash value of another log record included in the log record of the trust point, it is possible to verify the log record even when the verification has failed, and it is possible to positively verify the authenticity.

The first embodiment of this invention has been described above. According to this embodiment, in a digital signature technology for long-term assurance of authenticity of data that occurs in large quantity at any time, all the log records have a plurality of hash values of the log record positioned a plurality of log records before, to thereby form a plurality of hash chains.

Therefore, even when a given log record has been tampered, the authenticity of the other log records can be assured by another hash chain.

At this time, the number of verification steps for the digital signature is reduced by efficiently performing the verification of the log record positioned a plurality of log records before, to thereby be able to generate the log record while reducing a load on the computer imposed when the digital signature is generated.

Further, the hash chain for the log record positioned a plurality of log records before is created when the log record is generated, to thereby reduce the number of steps of the verification processing for the hash chain, and hence it is possible to realize the high-speed verification of the specific data.

In addition, the processing for verifying whether or not the log record positioned a plurality of log records before has been tampered is performed when the log record is generated, and hence the tampering of the log record can be discovered at an early stage.

It should be noted that this invention is not limited to the above-mentioned embodiment, and various modifications can be made within the scope of the gist thereof.

In the first embodiment, the third previous and the sixth previous log records are acquired, but it can be arbitrarily set how many hash values of the log record positioned how many log records before are taken, which may be the N-th previous (N is a constant) log record or may be the log record positioned a random number of log records before. In other words, a plurality of hash values may be acquired from the log record positioned a plurality of log records before. Further, it is also possible to set so that the hash value of the log record positioned a fixed time before is taken. When the hash value of the log record is acquired arbitrarily as described above, as a method of confirming that the log record at a time of log generation has not been tampered and building the verification route up to the specific data in the verification of the specific data, an optimal route can be calculated by applying a well-known or publicly-known graph theory.

Further, this embodiment can be realized by such configurations as illustrated in FIG. 1 to FIG. 3, but this invention is not limited to the above-mentioned configurations. Not only the log management server 101 but also the application server 102 may be provided with a function of generating and managing the log record illustrated in FIG. 5.

In addition, in the above-mentioned embodiment, the application server 102 sends the log data to the log management server 101 each time a log occurs, but may be able to send, for example, a file obtained by combining log data that occurs in one day to the log management server 101. In this case, there is a fear that the file may be tampered before being sent to the log management server 101, and hence as a countermeasure thereto, it is conceivable to provide the application server 102 with the function of generating the hash chain or to use a time stamp. As a method of processing the sent file by the log management server 101, it is conceivable to employ a method of creating the hash chain from the log record within the file or a method of creating the hash chain on a file-to-file basis by handling the file itself as the log data.

Further, the description of this embodiment is directed to the example in which the log data is used as the data to be verified, but this embodiment can be applied to the computer system for subjecting electronic data to the digital signature.

Figure 10:
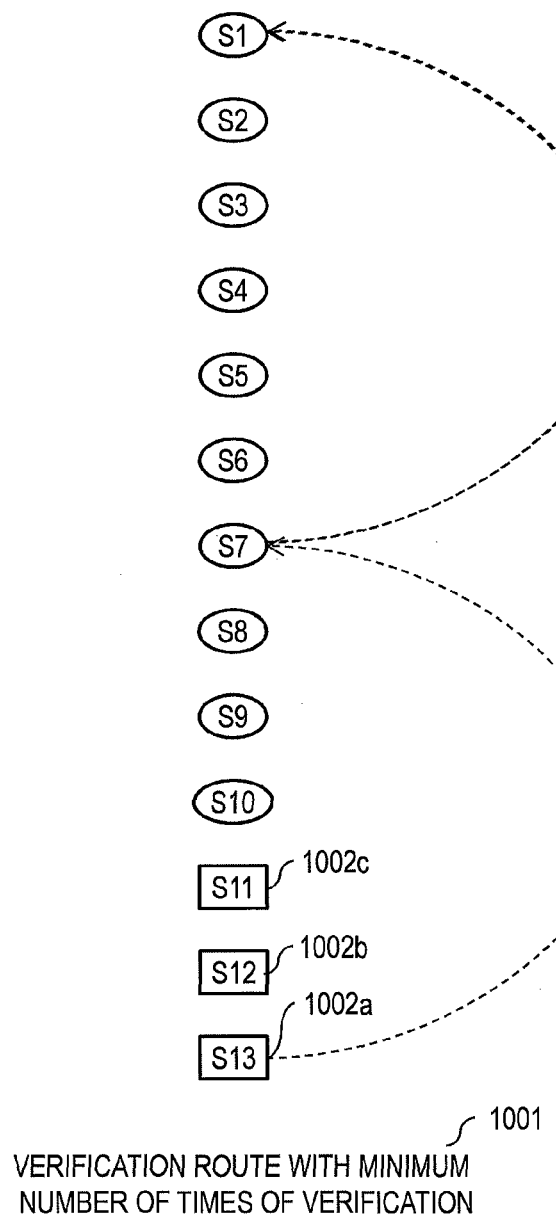
FIG. 10 shows a second embodiment of this invention, and is a diagram illustrating an example of tracing the hash chain when the high-speed verification.
Figure 11:
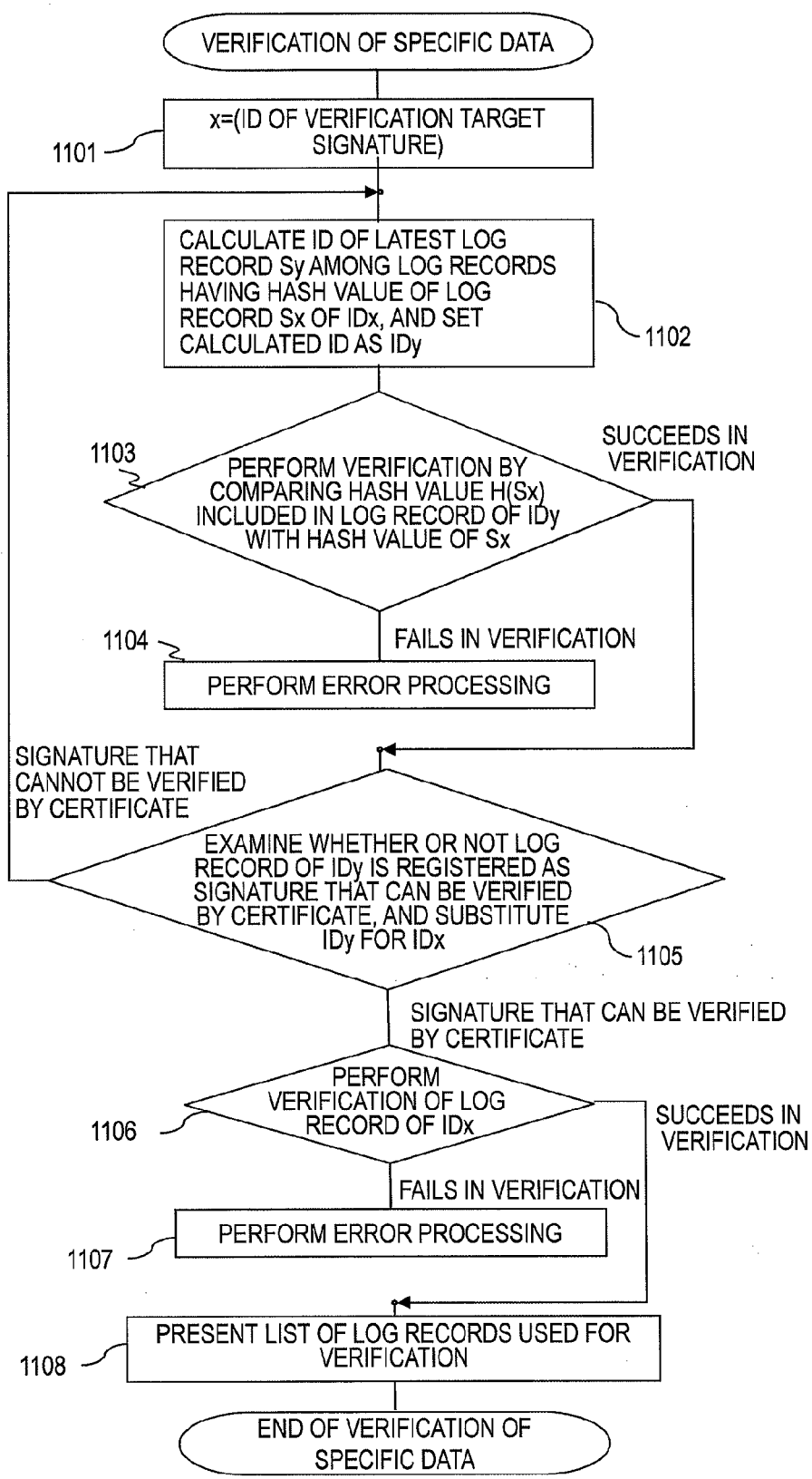
FIG. 11 shows the second embodiment of this invention, and is a flowchart illustrating an example of the verification processing for a verification route with the minimum number of times of verification.

FIG. 10 and FIG. 11 illustrate an example of a high-speed verification method for a specific log record according to a second embodiment of this invention. This second embodiment has a feature in that the trust point having the minimum number of times of verification of the hash chain is selected, the selected trust point and the hash chain of the verification target are verified, and the hash chain used for the verification is further output. In the first embodiment, the log record that has an unexpired signature and is closest to the verification target log record is selected as the trust point, but in this embodiment, a log record that has an unexpired signature and has a signature having the minimum number of times of verification of the hash chain is selected as the trust point.

This embodiment relates to a method obtained by changing the high-speed verification method described with reference to FIG. 8 and FIG. 9 in the first embodiment, and it is assumed that the log record is generated by the system configuration and the generation method for the log record that are described with reference to FIG. 1 to FIG. 7.

At this time, the trust point is a log record having an unexpired signature, and a normal electronic certificate normally has an expiry period of approximately five years, which means that a plurality of log records having an unexpired signature (trust points) exist at a given time point. For example, when an electronic certificate having an expiry period of five years is used, all the log records during five years at maximum can be set as the trust points.

FIG. 10 is a diagram illustrating an example of tracing the hash chain when the high-speed verification is performed in this embodiment. In FIG. 10, as an example, it is assumed that the log records S11 to S13 are the log records having an unexpired signature, and the log record S1 is the verification target log record. At this time, a set of log records that can be the trust points such as the log records having an unexpired signature are stored in the storage part 202 illustrated in FIG. 2, and stored in, for example, a DB or a file.

A processing method therefor is described below. In this embodiment, without first determining the trust point, the trust points are selected in parallel with the verification of the hash chain. Specifically, the expiry periods of the signatures of the log records S7 and S13 coupled to the log record S1 by the hash chain are examined in parallel with the verification of the hash chain of the log records S7 and S13 coupled to the verification target log record S1 by the hash chain, and when the signature to be the trust point is found, the tracing of the hash chain is brought to an end, to set the signature as the trust point. Then, the signature verification of the trust point is performed, and it is examined whether or not the verification target log record S1 is coupled to the trust point by the hash chain and the verification target log record S1 has not been tampered.

As described above, the verification of the verification target log record S1 is finished by performing hash value verification twice when the verification is performed by using the log record S13 as the trust point among the log records S11 to S13.

FIG. 11 is a flowchart illustrating an example of the verification processing for a verification route 1001 with the minimum number of times of verification illustrated in FIG.

10, which is performed by the signature verification part 204. The detailed description is made below with reference to FIG. 11.

First, the log record to be verified is acquired from the input/output part 210, and the ID of the acquired log record is substituted into the variable x that holds the ID of the verification target log record (Step 1101). Specifically, x is substituted with "1".

Subsequently, the signature verification part 204 calculates the log record having a hash value of Sx, and the ID of the latest log record among the calculated log records is substituted into a variable y that holds the ID of a comparison target log record (Step 1102). Specifically, the log records S2, S4, and S7 have the hash value of the verification target log record (S1), and the ID "7" for concatenation of the latest log record S7 thereof is substituted into the variable y.

Subsequently, the hash value comparison part 205 compares the hash value H (Sx) included in a log record Sy with the calculated hash value of the log record Sx, and performs the partial verification of the structure 601 of the hash chain illustrated in FIG. 6 (Step 1103). Specifically, the hash value H(S1) included in the log record S7 is compared with the calculated hash value of the log record S1. Therefore, the signature verification part 204 confirms that the log record S1 has not been tampered. Subsequently, the signature verification part 204 examines whether or not the log record Sy is registered as the trust point, and when the log record Sy is not registered, substitutes the variable x with the variable y, to advance to Step 1102. Specifically, the log record S7 is not registered as the trust point, and hence the variable x is substituted with the ID "7" for concatenation of the log record S7, the latest log record S13 among the log records S8, S10, and S13 having the hash value of the log record S7 is substituted into the variable y (Step 1102), and the hash value H(S7) included in the log record S13 is compared with the calculated hash value of the log record S7 (Step 1103).

Subsequently, the signature verification part 204 confirms that the log record S113 is registered as the trust point, and advances to Step 1106 to perform the signature verification of the log record S13. When the signature verification of the log record S13 is successful, it can be confirmed that the hash value H(S7) included in the log record S13 has not been tampered. When all the above-mentioned processing procedures are successful, the signature verification of the log record S13 selected as the trust point and the verification of the hash chain from the trust point up to the verification target log record S1 have been confirmed.

Subsequently, the signature verification part 204 presents the verification result and a list of the log records used for the verification to the user, and brings the verification of the verification target log record to an end (Step 1108). The list of the log records used for the verification represents, specifically, the log records S1, S7, and S13, and the data IDs 503 of the series of log records are presented to the user. It should be noted that the user may acquire the series of log records from the log record holding part 208 by using the data IDs 503 of the series of log records as keys.

It should be noted that, in the error processing of Step 1104 and Step 1107, the signature verification part 204 issues, to the user, an alert indicating that the log record Sy recorded in the storage part 202 may have been tampered or erased. For example, the data ID 503 of the tampered log record is transmitted to the computer of the user along with the error message, to be displayed on the output apparatus 406 of the computer.

In this error processing of Step 1104 and Step 1107, the verification of the specific data may be continued in another verification route. For example, it is also possible to select a verification route other than the verification route 1001 with the minimum number of times of verification illustrated in FIG. 10. For example, as a method of selecting another verification route, it is conceivable to select a verification route caused from another hash value included in the verified log record or a verification route caused from another hash value included in the log record that has assured the verified log record.

The second embodiment of this invention has been described above. According to this embodiment, by selecting an optimal trust point from among a plurality of trust points, the number of times of verification of the hash value can be minimized, and it is possible to perform the verification at higher speed than the method of selecting the earliest trust point as described in the first embodiment.

Further, by presenting the list of the log records used for the verification to the user, an evidence of the verification result can be provided to a third party. The user can acquire the series of log records included in the presented list of the log records from the log record holding part 208, and can provide the third party therewith. Without having to access the log management server 101, the third party can verify the authenticity of the verification target log record by using the list of the log records provided by the user. In other words, by using evidence information provided by the user, the third party can confirm the authenticity of the verification target log record by itself.

It should be noted that, in this second embodiment, the case where the hash values of the third previous and the sixth previous log records are included is assumed, but it can be arbitrarily set how many log records each positioned how many log records before are included, and by a set method, the trust point having the minimum number of times of verification of the hash chain can be selected. As an example of a selection method, a well-known or publicly-known graph theory may be applied.

Figure 12:
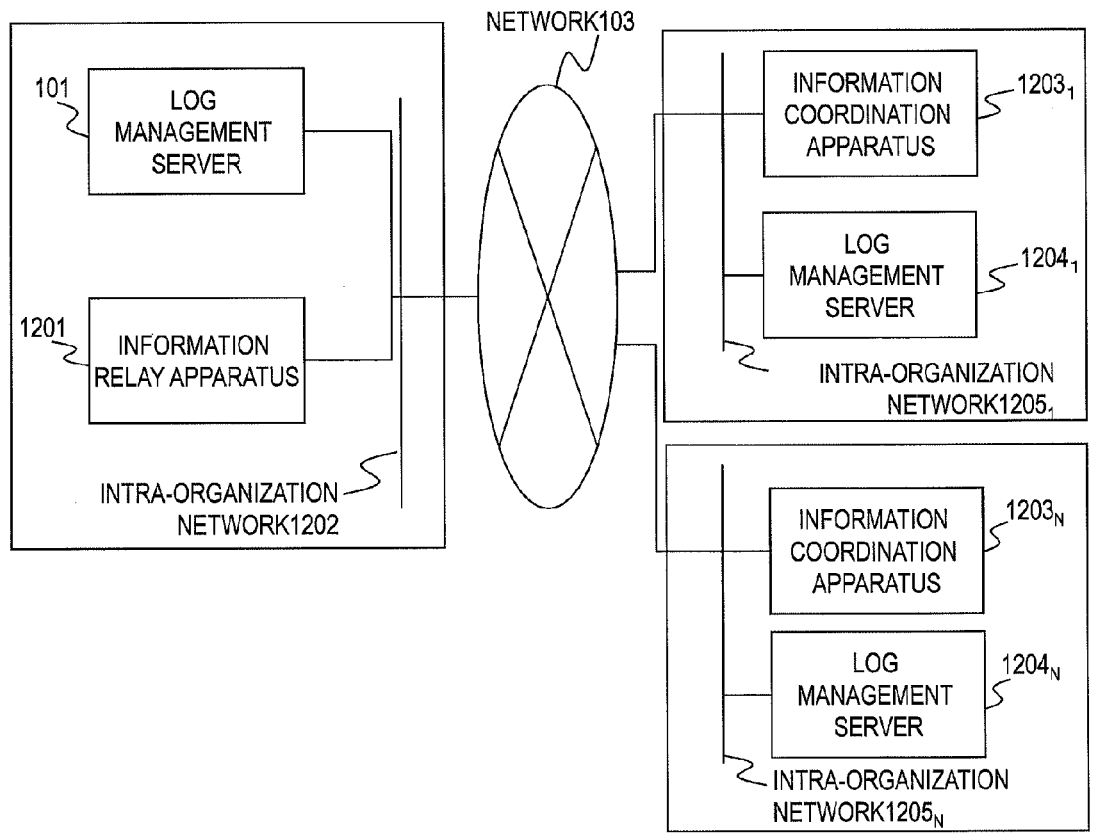
FIG. 12 shows a third embodiment of this invention, and is a block diagram illustrating an example of log data processing performed in the information coordination system.
Figure 13:
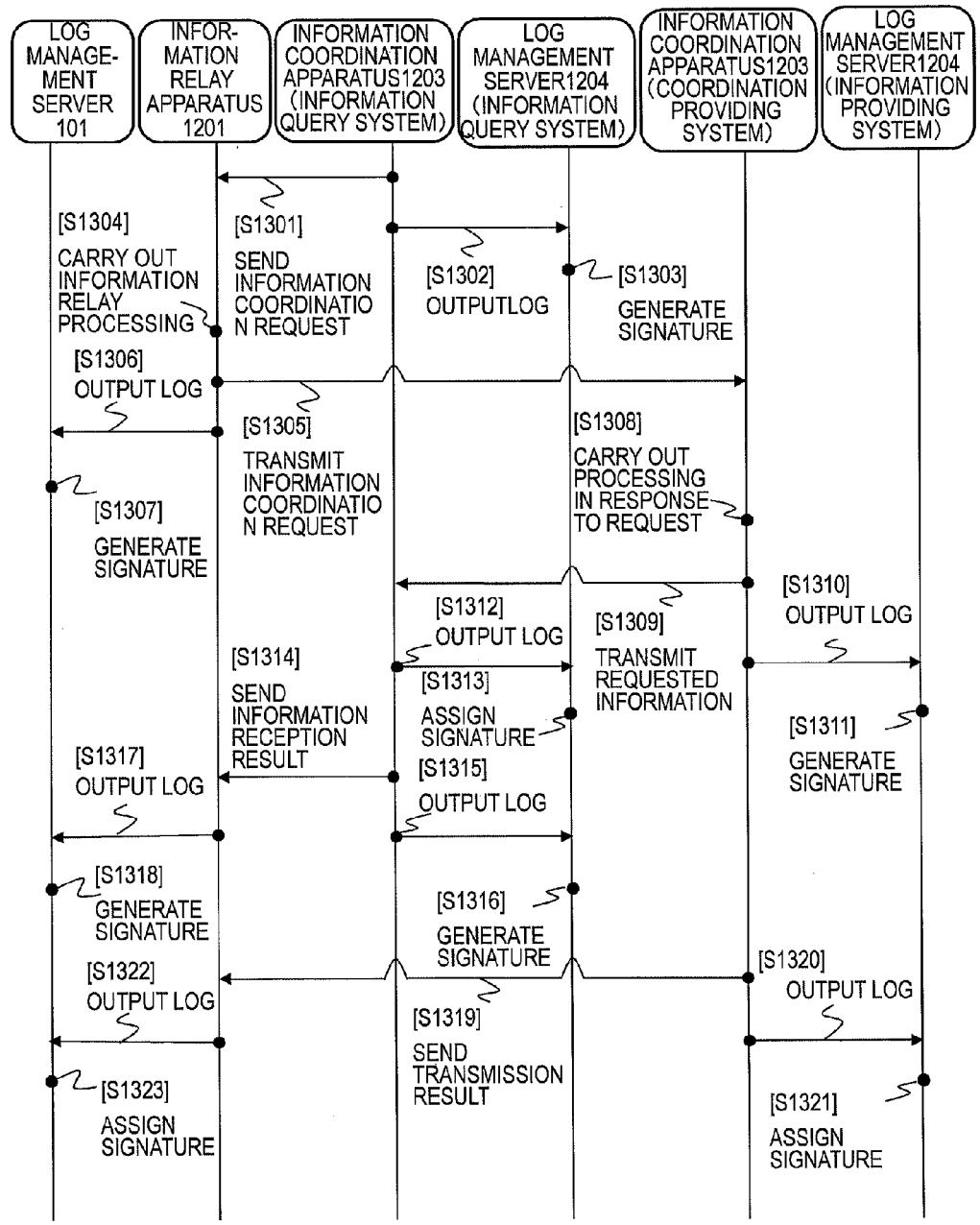
FIG. 13 shows the third embodiment of this invention, and is a flowchart illustrating an example of the information coordination processing.

Next, with reference to FIG. 12 and FIG. 13, a configuration of a third embodiment of this invention is described. This embodiment has a feature in that the data processing system described in the first and second embodiments is applied to an information coordination system.

The information coordination system is a system for performing relay when information relating to a given person or an organization such as a company is exchanged between different organizations such as an information query system and an information providing system. For example, when the information query system and the information providing system manage the given person or the organization such as the company by different IDs, conversion is performed from the ID of the information query system to the ID of the information providing system, to relay information coordination.

The information exchanged in the information coordination system includes much sensitive information relating to the person or the organization such as the company, and hence it is necessary to save the information on the information query system and the information providing system that are involved in the processing, a kind of exchanged personal information, and the like as audit trails, and the audit trails of the information coordination are archived in a log management server as the log data.

In this embodiment, the data processing system described with reference to FIG. 1 to FIG. 3 in the first embodiment is applied to the information coordination system, the log record described with reference to FIG. 5 to FIG. 7 is generated, and the high-speed verification can be performed by the processing described with reference to FIG. 8 and FIG. 9, or in the second embodiment.

FIG. 12 is a block diagram illustrating an example of log data processing performed in the information coordination system to which the third embodiment of this invention is applied.

The information coordination system, the information query system, and the information providing system are coupled to one another through the network 103 such as the Internet or a broadband WAN. The information coordination system includes the log management server 101 and an information relay apparatus 1201, and the log management server 101 and the information relay apparatus 1201 are coupled to each other through an intra-organization network 1202. The information query system and the information providing system include information coordination apparatus $1203_1$ and $1203_N$ (hereinafter referred to collectively as "information coordination apparatus 1203") and log management servers $1204_1$ to $1204_N$ (hereinafter referred to collectively as "log management server 1204"), and the information coordination apparatus $1203_1$ and $1203_N$ and the log management servers $1204_1$ to $1204_N$ are coupled to each other through intra-organization networks $1202_1$ to $1202_N$, respectively.

Next, respective apparatus included in the information coordination system illustrated in FIG. 12 are described. The information relay apparatus 1201 and the information coordination apparatus 1203 have the same configuration as that of the application server 102. In other words, processing relating to the information coordination is performed by the application processing part 304, data to be set as the audit trail of the information coordination is output by the log output processing part 303.

Next, an example of the log data processing performed in the information coordination system according to this embodiment is described with reference to FIG. 13. The information coordination apparatus 1203 of the information query system sends an information coordination request to the information relay apparatus 1201 at a timing at which an information coordination start instruction is received from an operator or the like of the information coordination apparatus 1203 or other such timing (Step S1301). The information query system that has sent the information coordination request outputs a record thereof to the log management server 1204 (Step S1302), and the log management server 1204 performs the processing of FIG. 7 to generate a signature to the record and archive the record (Step S1303).

The information relay apparatus 1201 that has received the information coordination request performs information relay processing for an ID indicating a person or an organization of a coordination target by, for example, converting the ID from an ID used in the information query system into an ID used in the information providing system (Step S1304). Then, the information relay apparatus 1201 transmits the information coordination request to the information coordination apparatus 1203 of the information providing system (Step S1305), and outputs a record of the processing results of Step S1304 and Step S1305 to the log management server 101 (Step S1306). The log management server 101 performs the processing of FIG. 7 to generate the signature to the record and archive the record (Step S1307).

The information coordination apparatus 1203 of the information providing system that has received the information coordination request performs processing such as generation of information to be transmitted in response to the information coordination request (Step S1308), and transmits a result thereof to the information query system (Step S1309). The information coordination apparatus 1203 outputs the log data on the results of the processing of Step S1308 and Step S1309 to the log management server 1204 (Step S1310), and the log management server 1204 performs the processing of FIG. 7 to generate the signature thereto and archive the log data (Step S1311).

The information coordination apparatus 1203 of the information query system that has received the requested information outputs a reception result to the log management server 1204 (Step S1312), and the log management server 1204 performs the processing of FIG. 7 to assign the signature thereto and archive the reception result (Step S1313). In addition, the information coordination apparatus 1203 of the information query system sends the reception result to the information relay apparatus (Step S1314), and outputs a record of a result of the processing of Step 1314 to the log management server 1204 (Step 1315), while the log management server 1204 performs the processing of FIG. 7 to generate the signature to the record and archive the record (Step 1316).

Subsequently, the information relay apparatus 1201 that has received the reception result outputs a result of the reception processing to the log management server 101 (Step S1317), and the log management server 101 performs the processing of FIG. 7 to generate the signature thereto and archive the result (Step 1318).

Further, the information providing system that has sent the requested information in Step S1309 transmits a transmission result to the information relay apparatus (Step S1319), and outputs a record of a result thereof to the log management server 1204 (Step S1320), while the log management server 1204 performs the processing of FIG. 7 to assign the signature to the log and archive the log (Step S1321).

The information relay apparatus that has received the transmission result of Step S1319 outputs the reception result to the log management server 101 (Step S1322), and the log management server 101 performs the processing of FIG. 7 to assign the signature to the log and archive the log (Step S1323).

The third embodiment of this invention has been described above.

According to this embodiment, in view of a use case where the record of the processing relating to the information coordination is generated each time a communication occurs and the authenticity thereof needs to be assured for a long term as the audit trail of the information coordination, a plurality of hash chains are formed by including a plurality of hash values of the log record positioned a plurality of log records before in all the log records in the digital signature technology for the long-term assurance of the authenticity of the audit trail.

Therefore, even when a given log record has been tampered, the authenticity of the other log records can be assured by another hash chain.

At this time, the number of verification steps for the digital signature is reduced by efficiently performing the verification of the log record positioned a plurality of log records before, to thereby be able to generate the log record while reducing the load on the computer imposed when the digital signature is generated.

Further, the hash chain for the log record positioned a plurality of log records before is created when the log record is generated, to thereby reduce the verification processing for the hash chain, and hence it is possible to realize the high-speed verification of the specific data.

It should be noted that, in the example of this embodiment, the description has been made of an access token method for returning information coordination result from a machine of the information providing system to a machine of the information query system in Step S1309, but the authenticity of the audit trail of the information coordination can be maintained also in the information coordination using a gateway method for performing the information coordination from the machine of the information providing system to the machine of the information query system via the information coordination system.

Figure 15:
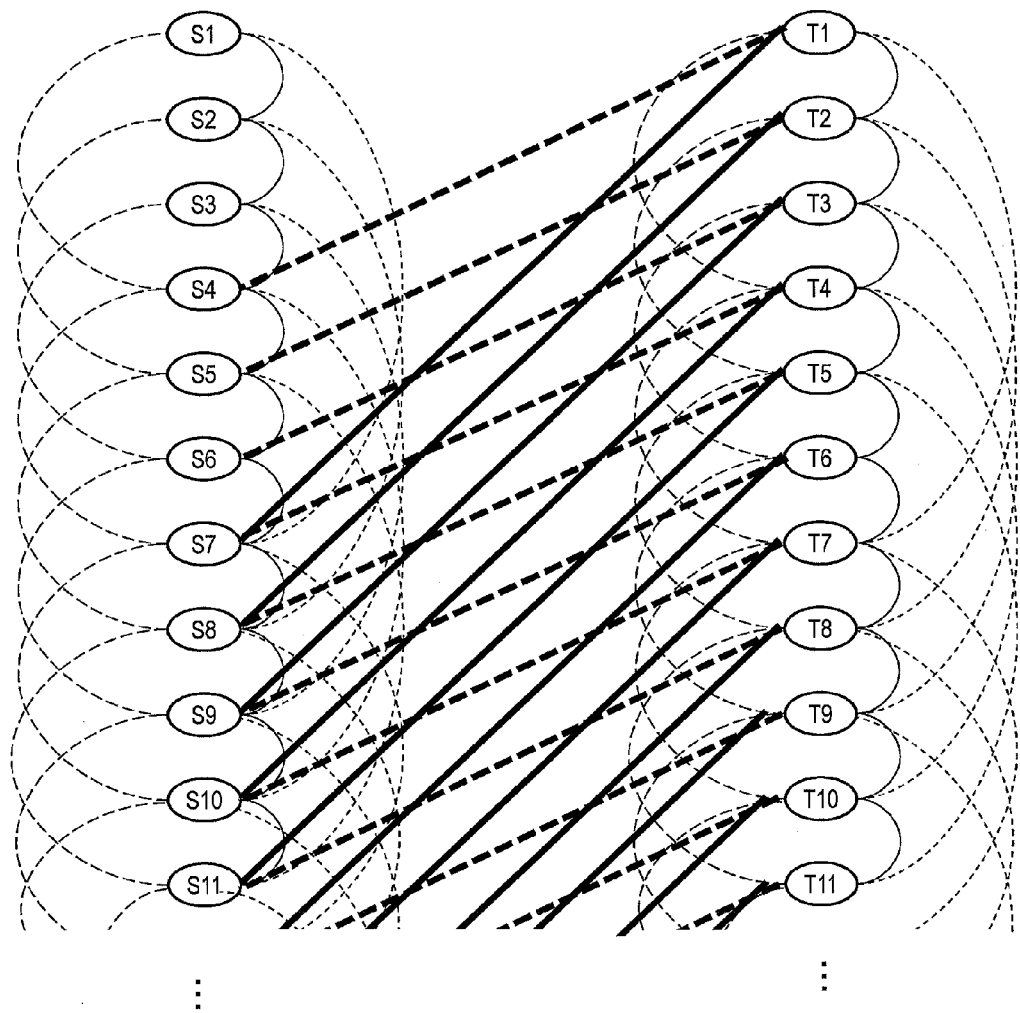
FIG. 15 shows the fourth embodiment of this invention, and is a diagram illustrating a structure of the hash chain for visualizing the structure of the hash chain of the log record.

With reference to FIG. 14 and FIG. 15, a description is made of an example in which complexity is further enhanced when the hash chain is generated according to a fourth embodiment of this invention.

This embodiment is has a feature in that, in a case where a plurality of aggregates of hash chains formed of a plurality of hash chains exist, the aggregates of hash chains are coupled by including, in the log record of a given aggregate of hash chains, a hash value of a log record positioned a plurality of log records before of the log record of another aggregate of hash chains.

The case where a plurality of aggregates of hash chains exist represents, for example, a case where the aggregate of hash chains is created for each of the application servers 102. In other words, when the log record is generated from the log data output from the application server 1021, the hash value of the log record generated from the third previous log data of the application server 1021 and the hash value of the log record generated from the sixth previous log data of the application server 1021 are included to form the aggregate of hash chains of the application server 1021. As described above, a plurality of aggregates of hash chains having the same number as the number of application servers exist.

It should be noted that the description of this embodiment is directed to an exemplary case where two aggregate of hash chains exist (it is assumed that the aggregate of the application server 1021 is referred to as "aggregate s", and the aggregate of the application server 1022 is referred to as "aggregate t").

In this embodiment, an improvement is made to the details (FIG. 5 and FIG. 6) of the log record generated by the generation method for the log record among the details of the first embodiment described with reference to FIG. 1 to FIG. 10, and the high-speed verification can be performed by the processing described with reference to FIG. 8 and FIG. 9, or in the second embodiment.

First, details of the log record are described with reference to FIG. 14.

One log record 1401 of the aggregate s includes, in addition to the fields 502 to 510 illustrated in FIG. 5, an aggregate ID 1402 serving as a unique ID indicating the aggregate, a hash value 1403 of the third previous log record of the aggregate t, an ID 1404 for concatenation serving as a unique ID indicating the hash value 1403 of the third previous log record of the aggregate t, a hash value 1405 of the sixth previous log record of the aggregate t, and an ID 1406 for concatenation serving as a unique ID indicating the hash value 1405 of the sixth previous log record of the aggregate t. It should be noted that it is assumed that the ID for concatenation includes the ID of the aggregate, and can identify the aggregate. Further, a signature 1407 is a digital signature assigned to the fields 502 to 509 and 1402 to 1406 in the same manner as the signature 510 illustrated in FIG. 5.

The signature generation part 203 of the log management server 101 generates, from the log data received from the application server 1021, the hash values of the first previous, the third previous, and the sixth previous log records of the aggregate of hash chains (aggregate s) of the application server 1021 in the same manner as in the first embodiment.

The signature generation part 203 further performs the arithmetic operation for the hash value 1403 of the third previous log record of the aggregate of hash chains (aggregate t) of the application server $102_2$, replicates the hash value of the sixth previous log record of the aggregate t from the hash value of the third previous log record of the aggregate t, and assigns the digital signature to the log record. Further, the signature generation part 203 assigns the ID for concatenation to the first previous, the third previous, and the sixth previous log records of the aggregate s and the third previous and the sixth previous log records of the aggregate t.

Next, FIG. 15 illustrates a structure 1501 of the hash chain for visualizing the structure of the hash chain of the log record exemplified in FIG. 14. As illustrated in FIG. 15, the log records of the aggregate s includes the hash values of the first previous, the third previous, and the sixth previous log records of the own aggregate and the hash values of the third previous and the sixth previous log records of the aggregate t. As illustrated in FIG. 15, the chains (hash chains) of all the log records are formed respectively by the hash values of the first previous, the third previous, and the sixth previous log records of the own aggregate and the hash values of the third previous and the sixth previous log records of the aggregate t. In other words, the hash chains are also formed between the aggregate s and the aggregate t.

Normally, the hash chains generated by using the method illustrated in FIG. 14 and FIG. 15 are verified by the methods described in the first embodiment and the second embodiment, but when no trust point exists in the own aggregate due to a leak of the secret key caused by an attacker or the like, the verification is performed by tracing the hash chain that links the trust point existing in another aggregate to the verification target.

The fourth embodiment has been described above. When this embodiment is applied, the hash chain is generated between the own aggregate and another aggregate. Therefore, the complexity of the chains is enhanced, which increases tolerance to attack. For example, even when the signature becomes invalid due to a leak of the secret key corresponding to a given aggregate or the like, unless the signature of another aggregate becomes invalid, the verification can be performed by tracing the hash chain from the another aggregate or the like.

It should be noted that the log record generated as a result of this embodiment can also be applied to the high-speed verification according to the second embodiment and the information coordination system according to the third embodiment.

Next, a configuration of a fifth embodiment of this invention is described with reference to FIG. 16 to FIG. 18.

This fifth embodiment is has a feature in that, in the information query system, the information providing system, and the like that are described in the third embodiment, instead of locating the respective log management servers, functions whose commonality can be achieved are shared as the log management server by a plurality of systems, and a part that cannot be shared is located in each system as a log management client. Specifically, the log management client has a function of calculating the hash value, and sends the hash value to the log management server after calculating the hash value of the log data. The log management server assigns the signature to the hash value received from the log management client.

In this embodiment, the log is output at the timing described with reference to FIG. 13 in the third embodiment, the log record described in the first embodiment and the fourth embodiment is generated, and the high-speed verification described in the first embodiment and the second embodiment is performed.

Figure 16:
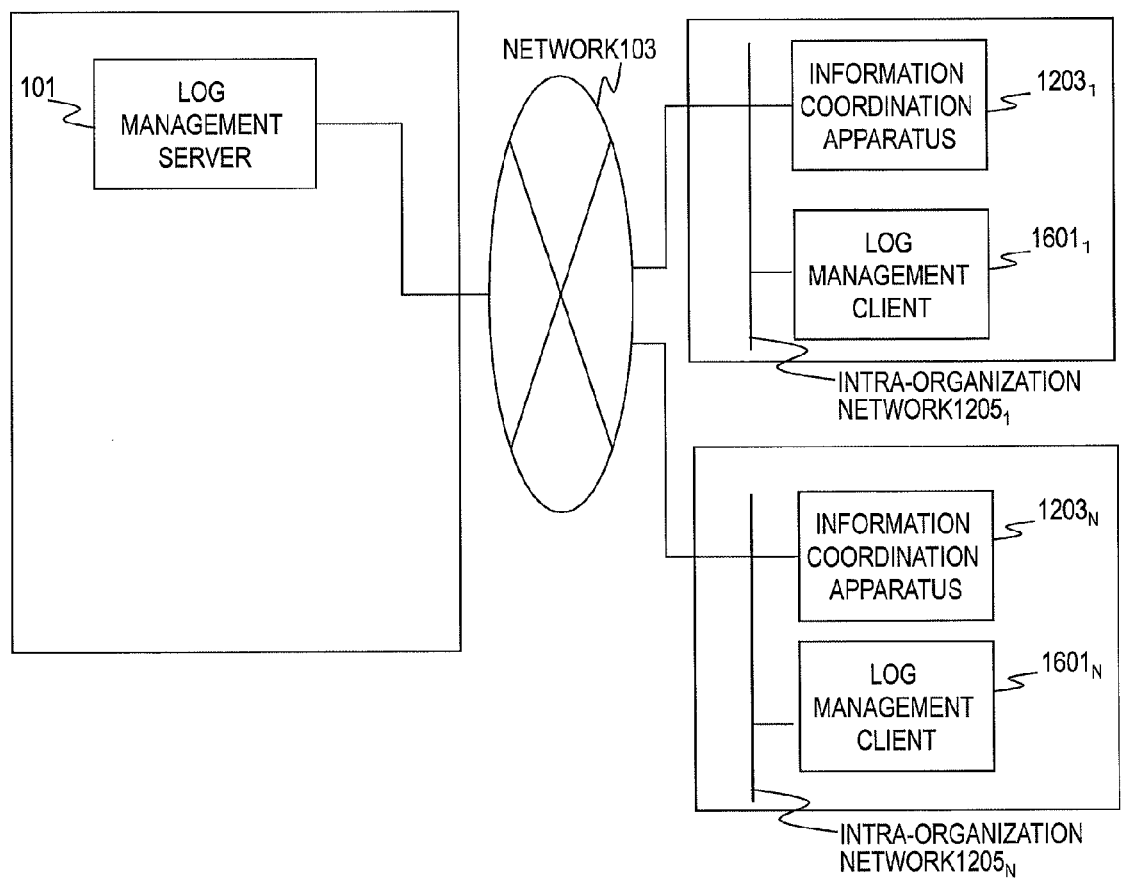
FIG. 16 shows a fifth embodiment of this invention, and is a block diagram illustrating an example of a log management system.

FIG. 16 is a block diagram illustrating an example of a log management system to which the fifth embodiment of this invention is applied. The log management system, the information query system, and the information providing system are coupled to one another through the network 103 such as the Internet or a broadband WAN. The log management system includes the log management server 101. The information query system and the information providing system include the information coordination apparatus $1203_1$ and $1203_N$ (hereinafter referred to collectively as "information coordination apparatus 1203") and log management clients $1601_1$ to $1601_N$ (hereinafter referred to collectively as "log management client 1601), and the information coordination apparatus $1203_1$ and $1203_N$ and the log management clients $1601_1$ to $1601_N$ are coupled to each other through intra-organization networks $1205_1$ to $1205_N$, respectively.

Next, the log management client 1601 is described with reference to FIG. 17. FIG. 17 is a block diagram illustrating an example of functional components of the log management client 1601.

The log management client 1601 includes a processing part 1701 for calculating the hash value of the log data from the log data sent from the information coordination apparatus 1203 and issuing a verification request to the log management server, a storage part 1702 for storing the log data or the like sent from the information coordination apparatus 1203, an input/output part 1707 for receiving an input from the user or the administrator, and a communication part 1708 for receiving the log data output from the information coordination apparatus 1203.

The processing part 1701 includes a hash value generation part 1703 for generating the hash value of the log data, a signature verification request part 1704 for issuing a verification request to the log management server, and a control part 1705 for controlling those parts.

The storage part 1702 includes a log data holding part 1706 for storing the log data.

The information query system or the information providing system that uses the log management system sends each of the secret keys to the log management system, and the log management system saves the secret keys to the secret key/certificate holding part 209.

Figure 17:
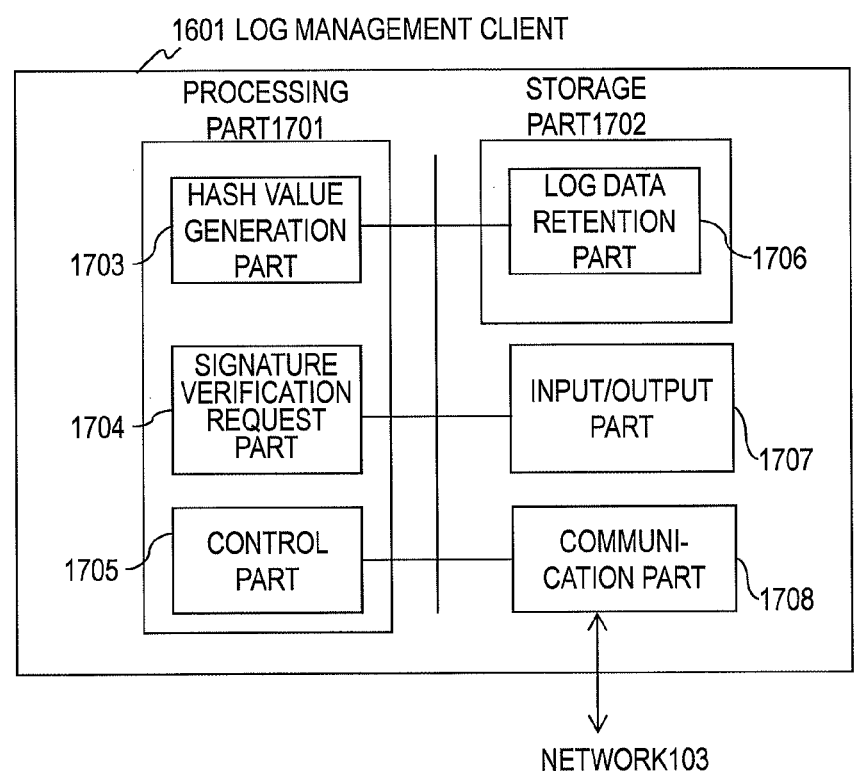
FIG. 17 shows the fifth embodiment of this invention, and is a block diagram illustrating an example of functional components of the log management client.
Figure 18:
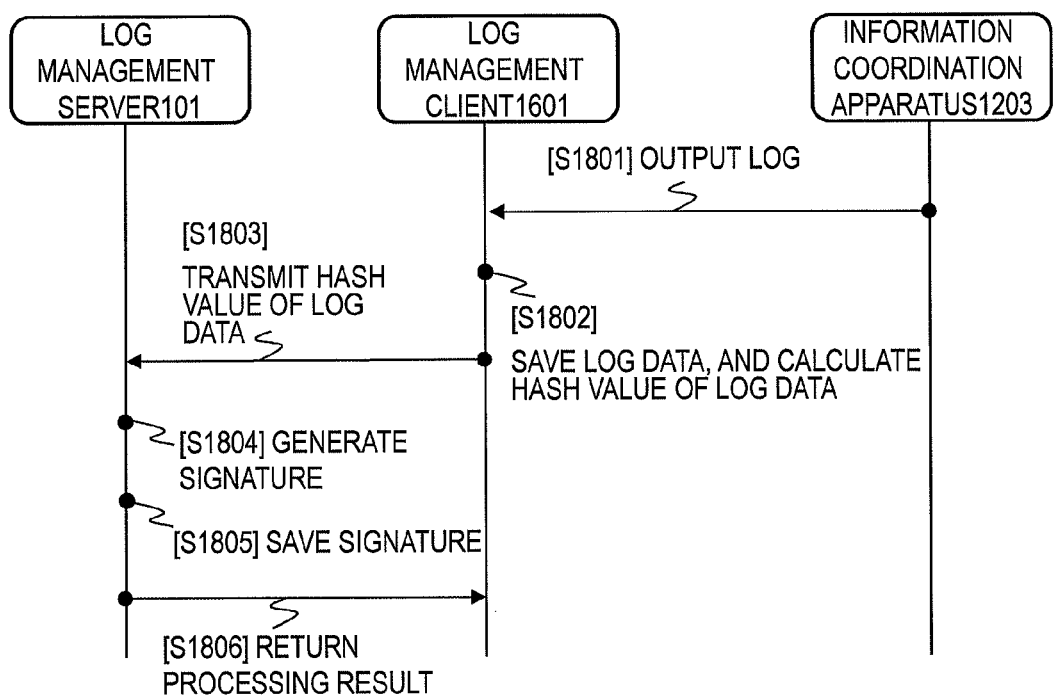
FIG. 18 shows the fifth embodiment of this invention, and is a flowchart illustrating an example of the log generating processing.

It should be noted that the log management client 1601 exemplified in FIG. 17 can be realized by using such an apparatus as illustrated in FIG. 4 and programs or hardware having functions equivalent thereto in the same manner as the log management server 101 and the application server 102 according to the first embodiment.

Next, an example of log generation processing according to this embodiment is described with reference to FIG. 18.

The information coordination apparatus 1203 transmits the log data to the log management client 1601 at the timings of Steps 1302, 1310, 1312, 1315, and 1320 (Step S1801). The log management client that has received the log data saves the log data to the log data holding part 1706, generates the hash value of the log data by the hash value generation part 1703 (Step S1802), and transmits the hash value of the log data to the log management server (Step S1803).

Figure 19:
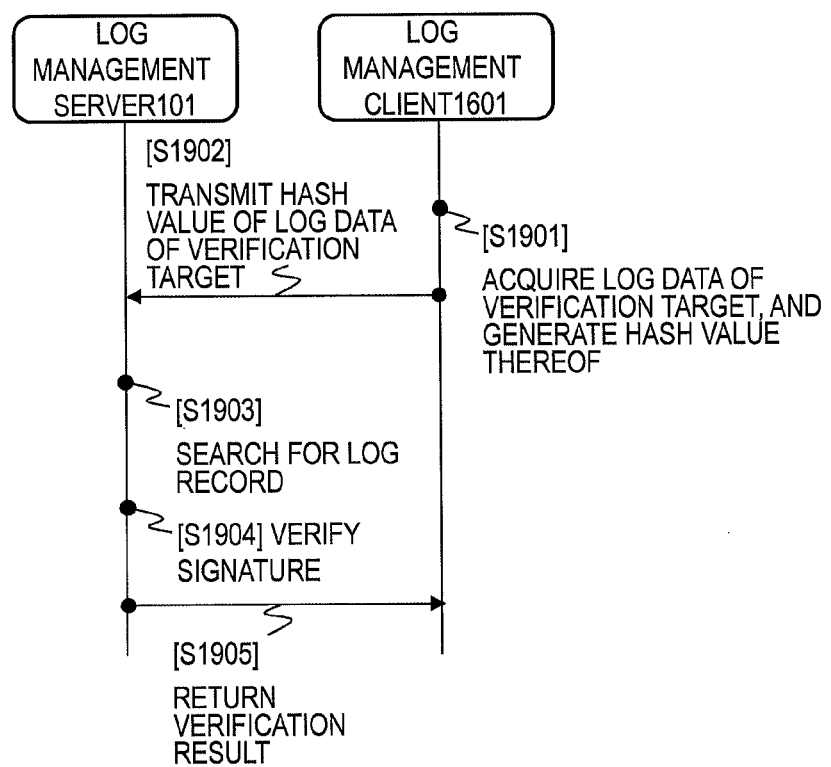
FIG. 19 shows the fifth embodiment of this invention, and is a flowchart illustrating an example of the log verification processing.

The log management server 101 that has received the hash value of the log data performs the processing of FIG. 6 to generate the signature to the log (Step S1804) and archive the log (Step S1805), and returns the processing result (Step S1806). At this time, as described above, the log management server assigns the signature to the hash value of the log data sent from the log management client, and hence the log data within the log record 501 is H(M1), while the signature 510 is Sign(H(M1)||IV||IV||IV). Next, an example of log verification processing according to this embodiment is described with reference to FIG. 19.

The log management client 1601 acquires verification target log data held in the storage part 1702, generates the hash value of the log data by the hash value generation part 1703 (Step S1901), and transmits the hash value of the log data to the log management server (Step S1902).

The log management server that has received the hash value of the log data searches for the log record including the log data by using the received hash value of the log data as a search key (Step S1903), performs the verification by performing the processing of FIG. 9 or FIG. 11 for the retrieved log record (Step S1904), and returns the verification result to the log management client (Step S1905).

The log management client that has received the verification result confirms that the log data has not been tampered because the log record including the transmitted hash value exists, and brings the verification to an end.

The fifth embodiment has been described above. When this embodiment is applied, in the third embodiment, it is possible to minimize cost on the information query system side or the information providing system side and to assure the authenticity of the log data such as the record of the information coordination or the like.

At this time, on the log management client, the hash value of the log data is calculated instead of the log data itself and transmitted to the log management server, to thereby be able to reduce a load on the network 103.

It should be noted that the log data may be transmitted to the log management server and managed thereby when, for example, the network 103 has sufficient performance.

Further, the log management system may perform nothing other than saving the signature with the log management client having a function of storing the secret key and a function of generating signature generation.

Further, in Step S1806, the log management server may return information for identifying the log record such as the data ID 503 or the aggregate ID 1402 together to the log management client. In addition, the log management server may use the information for identifying the log record to perform a search.

As described above, this invention can be applied to the computer or the computer system for verifying data whose digital signature has an expiry period. In particular, it is preferred that the invention be applied to the computer system for performing a hysteresis signature.

What is claimed is:

1. A data authenticity assurance method carried out by a management computer comprising a processor and a memory, comprising:

carrying out signature generation processing for generating a second data piece by assigning a digital signature to data, which is obtained by combining a first data piece received from a computer with a hash value of at least one second data piece acquired from second data pieces held in a data holding part of the management computer, by using a preset key, and holding the generated second data piece in the data holding part; and carrying out signature verification processing for verifying authenticity by intermittently tracing a plurality of hash chains based on a plurality of second data pieces held in the data holding part and the second data piece of a verification target, wherein:

the carrying out of the signature generation processing comprises:
- a first step of receiving the first data piece from the computer;
- a second step of selecting a plurality of second data pieces at predetermined intervals in chronological order from among positioned plurality of second data pieces before held in the data holding part;
- a third step of performing an arithmetic operation for each of the hash values of the selected plurality of second data pieces;
- a fourth step of generating signature target data by combining the first data piece received from the computer with the hash values of the selected plurality of second data pieces; and
- a fifth step of generating a second data piece by assigning the digital signature to the signature target data by using the preset key, and holding the generated second data piece in chronological order sequentially in the data holding part; and the carrying out of the signature verification processing comprises:
- a sixth step of receiving the second data piece of the verification target;
- a seventh step of acquiring a second data piece that is verifiable alone from the data holding part, and verifying the second data piece; and
- an eighth step of performing verification for the second data piece of the verification target to the second data piece that is verifiable alone by sequentially comparing a hash value obtained by the arithmetic operation from the second data piece with the positioned plurality of second data pieces before including the hash value, and performing the verification by intermittently tracing the plurality of hash chains.

2. The data authenticity assurance method according to claim 1, wherein the second step comprises selecting, by the management computer, from the first previous second data piece and the $(n \times 2^{(p-1)})$th previous second data piece, the $(N \times 2^{(p-1)})$ being a general term serving as a geometric progression of a first term of N and a common ratio of 2, when the at least one second data piece is selected at the predetermined intervals in chronological order.

3. The data authenticity assurance method according to claim 1, wherein the third step comprises acquiring, by the management computer, instead of performing the arithmetic operation for each of the hash values of the plurality of second data pieces, another second data piece including the hash value of the second data piece of an arithmetic operation target from the data holding part, and replicating and acquiring the hash value of the second data piece of the arithmetic operation target from the acquired another second data piece.

4. The data authenticity assurance method according to claim 1, wherein:
the third step comprises a ninth step of examining the authenticity of each of the plurality of second data pieces; and
the ninth step comprises executing the sixth step to the eighth step with each of the plurality of second data pieces set as the verification target.

5. The data authenticity assurance method according to claim 1, wherein the eighth step comprises continuing the verification by acquiring another second data piece including the hash value from the data holding part and setting the another second data piece as a comparison target in one of: a case where the hash value obtained by the arithmetic operation from the second data piece does not match the second data piece including the hash value; and a case where the second data piece does not exist, when comparison is sequentially performed for the second data piece of the verification target to the second data piece that is verifiable alone.

6. The data authenticity assurance method according to claim 1, wherein the seventh step comprises selecting the second data piece that is verifiable alone, which has a minimum number of times that the plurality of hash chains are intermittently traced, from among a plurality of second data pieces that can is verifiable alone when the second data piece that is verifiable alone is selected.

7. The data authenticity assurance method according to claim 1, wherein the eighth step comprises presenting all the second data pieces used for the verification when the plurality of hash chains are intermittently traced, to a user of the management computer.

8. The data authenticity assurance method according to claim 1, wherein:
the management computer comprises the computer to form a relay system;
the relay system is coupled to a plurality of processing systems comprising the computer; and
the data authenticity assurance method further comprises generating, when a third data piece comprising electronic data is transmitted from one processing system to another processing system among the plurality of processing systems via the relay system, by the computer forming the relay system, a record of processing transmitted from a processing system comprising the third data piece to another processing system as the first data piece, and transmitting the record to the management computer forming the relay system.

9. The data authenticity assurance method according to claim 1, wherein:
the management computer is coupled to a plurality of computers;
the first step comprises identifying which computer among the plurality of computers the first data piece has been received from;
the second step comprises managing/holding, by the management computer, when the plurality of second data pieces are selected at the predetermined intervals in chronological order, the plurality of second data pieces held in the data holding part for each of the plurality of computers, and selecting the second data piece separately managed/held so as to correspond to the computer identified in the first step; and
the fifth step comprises managing/holding, by the management computer, when the generated second data pieces are held in chronological order sequentially in the data holding part, the generated second data pieces separately for each of the plurality of computers, to thereby form each of the plurality of hash chains for each of the plurality of computers.

10. The data authenticity assurance method according to claim 9, wherein the second step further comprises selecting, by the management computer, when the plurality of second data pieces are selected at the predetermined intervals in chronological order, the second data piece managed/held so as to correspond to the computer identified in the first step and the second data piece managed/held so as to correspond to the computer other than the identified computer from the chronological-order second data pieces managed/held for each of the plurality of computers in the fifth step.

11. The data authenticity assurance method according to claim 1, wherein:

the first step comprises calculating, by the computer, hash data of a fourth data piece held in the computer, holding the fourth data piece in the data holding part of the computer, transmitting the hash data to the management computer, and receiving, by the management computer, the hash data as the first data piece; and the sixth step comprises acquiring, by the computer, the fourth data piece of a verification target from the data holding part, calculating the hash data of the acquired fourth data piece, transmitting the hash data to the management computer, and receiving, by the management computer, the hash data as the first data piece.

12. A management computer, comprising:
a hardware processor;
a memory; and
a controller for carrying out:
  signature generation processing for generating a second data piece by assigning a digital signature to data, which is obtained by combining a first data piece received from a computer with a hash value of at least one second data piece acquired from second data pieces held in a data holding part of the management computer, by using a preset key, and holding the generated second data piece in the data holding part; and
  signature verification processing for verifying authenticity by intermittently tracing a plurality of hash chains based on a plurality of second data pieces held in the data holding part and the second data piece of a verification target, wherein:
the controller is configured to, in the signature generation processing:
  receive the first data piece from the computer;
  select a plurality of second data pieces at predetermined intervals in chronological order from among positioned plurality of second data pieces before held in the data holding part;
  perform an arithmetic operation for each of the hash values of the selected plurality of second data pieces;
  generate signature target data by combining the first data piece received from the computer with the hash values of the selected plurality of second data pieces; and
  generate a second data piece by assigning the digital signature to the signature target data by using the preset key, and hold the generated second data piece in chronological order sequentially in the data holding part; and
the controller is further configured to, in the signature verification processing:
  receive the second data piece of the verification target;
  acquire a second data piece that is verifiable alone from the data holding part, and verifying the second data piece; and
  perform verification for the second data piece of the verification target to the second data piece that is verifiable alone by sequentially comparing a hash value obtained by the arithmetic operation from the second data piece with the positioned plurality of second data pieces before including the hash value, and perform the verification by intermittently tracing the plurality of hash chains.

13. A computer-readable non-transitory storage medium having stored thereon a data authenticity assurance program executed by a computer comprising a processor and a memory, the data authenticity assurance program controlling the computer to execute:
  signature generation processing for generating a second data piece by assigning a digital signature to data, which is obtained by combining a first data piece received from a computer with a hash value of at least one second data piece acquired from second data pieces held in a data holding part of a management computer, by using a preset key, and holding the generated second data piece in the data holding part; and
  signature verification processing for verifying authenticity by intermittently tracing a plurality of hash chains based on a plurality of second data pieces held in the data holding part and the second data piece of a verification target, wherein:
the executing of the signature generation processing comprises:
  a procedure for receiving the first data piece from the computer;
  a procedure for selecting a plurality of second data pieces at predetermined intervals in chronological order from among positioned plurality of second data pieces before held in the data holding part;
  a procedure for performing an arithmetic operation for each of the hash values of the selected plurality of second data pieces;
  a procedure for generating signature target data by combining the first data piece received from the computer with the hash values of the selected plurality of second data pieces; and
  a procedure for generating a second data piece by assigning the digital signature to the signature target data by using the preset key, and holding the generated second data piece in chronological order sequentially in the data holding part; and
the executing of the signature verification processing comprises:
  a procedure for receiving the second data piece of the verification target;
  a procedure for acquiring a second data piece that is verifiable alone from the data holding part, and verifying the second data piece; and
  a procedure for performing verification for the second data piece of the verification target to the second data piece that is verifiable alone by sequentially comparing a hash value obtained by the arithmetic operation from the second data piece with the positioned plurality of second data pieces before including the hash value, and performing the verification by intermittently tracing the plurality of hash chains.

* * * * *